United States Patent
Kasahara et al.

(10) Patent No.: US 6,822,701 B1
(45) Date of Patent: Nov. 23, 2004

(54) LIQUID CRYSTAL DISPLAY APPARATUS

(75) Inventors: Touko Kasahara, Tenri (JP); Hiroshi Shimokawa, Nara (JP); Katsumi Irie, Kashihara (JP); Hisakazu Nakamura, Yamatokoriyama (JP); Kyoushi Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/388,605

(22) Filed: Sep. 2, 1999

(30) Foreign Application Priority Data

Sep. 4, 1998 (JP) .......................................... 10-250577
May 26, 1999 (JP) .......................................... 11-146139

(51) Int. Cl.$^7$ .......................................... G02F 1/1368
(52) U.S. Cl. .......................... 349/38; 349/43; 349/192
(58) Field of Search .......................... 349/38, 39, 43, 349/54, 55, 192

(56) References Cited

U.S. PATENT DOCUMENTS

| | | | |
|---|---|---|---|
| 5,132,819 A | * 7/1992 | Noriyama et al. | 349/55 |
| 5,943,106 A | 8/1999 | Sukenori et al. | |
| 5,977,563 A | * 11/1999 | Kubo et al. | 257/72 |
| 5,995,178 A | * 11/1999 | Fujikawa et al. | 349/55 |
| 6,259,494 B1 | * 7/2001 | Kawai et al. | 349/39 |

FOREIGN PATENT DOCUMENTS

| | | |
|---|---|---|
| JP | 58-184758 A | 10/1983 |
| JP | 63-136076 A | 6/1988 |
| JP | 1-96949 A | 4/1989 |
| JP | 3-55985 B2 | 8/1991 |
| JP | 9-152625 A | 6/1997 |
| JP | 10-96949 A | 4/1998 |
| JP | 10-232408 A | 9/1998 |
| JP | 22-242242 A | 9/1999 |

OTHER PUBLICATIONS

U.S. patent application SN 09/207,591, filed Dec. 8, 1998 entitled "Reflective Liquid Crystal Display Device" which corresponds to JP 11–242242 cited in the Notification of Reason for Refusal.

Notification of Reason for Refusal dated Jan. 7, 2003 issued in corresponding Japanese application No. 11–146139.

Notification of Reason for Refusal mailed Aug. 19, 2003 in corresponding JP patent application No. 10–250577.

* cited by examiner

*Primary Examiner*—Tarifur R. Chowdhury
*Assistant Examiner*—Tai Duong
(74) *Attorney, Agent, or Firm*—Nixon & Vanderhye, P.C.

(57) ABSTRACT

A liquid crystal display apparatus has an improved repair success rate. In the liquid crystal display apparatus, a pixel electrode is electrically connected to a drain electrode of a thin-film transistor. The drain electrode has a substantial correction site which is narrowed in width. An opening is formed in a certain region of said pixel electrode, overlying the substantial correction site of the drain electrode, the opening being in contact with the outer periphery of the pixel electrode.

15 Claims, 27 Drawing Sheets

423: SEMICONDUCTOR LAYER

LIQUID CRYSTAL DISPLAY APPARATUS

BACKGROUND OF THE INVENTION

1. Field of the Invention

The present invention relates to liquid crystal display apparatus for use as display units in computers, audio-visual equipment and the like.

2. Description of the Related Art

Generally a liquid crystal display apparatus with switching elements is provided with an auxiliary capacitance electrode which comprises an auxiliary capacitor, as well as pixel electrodes for use in driving pixels of a liquid crystal layer. In the case where such pixel-driving pixel electrode is disposed via an interlayer insulating film on the pixels, an underlying auxiliary capacitance electrode is provided due to the fact that thickness of the interlayer insulating film is large.

FIG. 28A is a view showing a plan view of one example of the liquid crystal display apparatus mentioned above, whereas FIG. 28B is a partial sectional view showing a thin-film transistor (TFT) for use as a switching element in the liquid crystal display apparatus as shown in FIG. 28A. The liquid crystal display apparatus of such a constitution has been disclosed for example, in Japanese Unexamined Patent Publication JP-A 9-152625.

In FIGS. 28A and 28B a TFT 124 is provided on a substrate 131, and an underlying electrode 125 is formed so as to connect to a drain electrode 136b of this TFT 124. This underlying electrode 125 may sometimes be called a "drain electrode" in the case where it is made integral with the drain electrode 136b. An interlayer insulating film 138 is so formed as to overlay this structure, and pixel electrodes 121 formed thereon are electrically connected to the underlying electrode 125 via a contact hole 126 that is provided in the interlayer insulating film 138.

In addition, the underlying electrode 125 is designed so as to extend up to the center of the pixel electrode 121 while an auxiliary capacitor electrode 125a is so formed as to oppose an auxiliary capacitance line 127 which is formed under a gate insulation film 133 which covers a gate electrode 132 which constitutes part of the TFT 124. An auxiliary capacitor section is formed at a portion at which this auxiliary capacitance line 127 opposes the auxiliary capacitor electrode 125a. Since the underlying electrode 125 is aimed to fabricate the intended auxiliary capacitor section, this electrode is formed to be partly narrowed in width in regions other than a region for the auxiliary capacitor section.

In the active matrix substrate having the switching element formed thereon, defects may be generated during manufacturing processes. The defects may result in creation of unwanted display defects or image visualization failures including, but not limited to, line defects, inadvertent bright dots, and flicker. For this reason, there have been proposed and developed a variety of defect repairing techniques in order to increase production yields, and one or a combination of a plurality of defect repairing techniques has been implemented.

As a typical repairing technique, for example, Japanese Examined Patent Publication JP-B2 3-55985 (1991) discloses a line defect repairing technique in the case of short circuit between a data signal transmission line 401 and a transmission line 402 in a MOS transistor 408, as shown in FIGS. 29A–29B.

More specifically, as shown in FIGS. 29A, 29B, suppose a gate electrode 420 has been cut and thus separated from the scan signal transmission line 402, by use of a laser beam. Thereafter, as the repairing technique laser irradiation is aimed at specified positions shown by arrows Y, Z, from either the top surface or bottom surface of a substrate. The irradiation permits a source electrode 421 and drain electrode 422 to be electrically shorted together via the gate electrode 420 that has experienced the laser-cutting process. This electrical shorting results in application of an average voltage potential of data signals to the pixel electrode 406, which in turn reduces or minimizes recognizability of defects.

The conventional defect repairing technique above is inherently for use with liquid crystal display apparatus of the transmission type. The applicants named herein have proposed in Japanese Patent Application 9-355824 a defect repairing technique adapted for use in liquid crystal display apparatus of the reflection type as typically shown in FIG. 30.

However, this reflection type defect repairing technique, which is designed for repair of defects occurring in the manufacturing processes, irradiates a substrate 430 shown in FIG. 30 with laser light or beam at a portion to be corrected, from the bottom surface of the substrate, thereby cutting and blowing the to-be-corrected portion away from the substrate. This approach is inherently faced with a problem that cracks or "infractions" can occur in the interlayer insulating film 434 during the laser irradiation. Such cracks would result, when the pixel electrode 435 overlies the to-be-corrected portion, in undesired projection of such overlying pixel electrode 435 toward a liquid crystal layer 454 together with the cracked interlayer insulating film 434. This projected pixel electrode 435 badly behaves to deform and come into contact with an opposed or "counter" electrode 451 and/or the cross-section of the to-be-corrected portion thus letting different signal transmission lines be electrically shorted together, which leads to creation of secondary defects.

Another problem encountered with the approach is that fragments of the interlayer insulating film 434 with the conductive pixel electrode 435 attached thereto reside and float inside of the liquid crystal layer 454, which would result in inadvertent conduction with the counter electrode 451 and other associative electrodes—in particular, the pixel electrode 435—thereby causing creation of defects therein.

Especially, as shown in FIG. 31, in the case of reflective liquid crystal display apparatus which make use of a pixel electrode 435 made typically of aluminum (Al) or other conductive materials equivalent thereto, fuzz- or fluff-like irregular portions 500 can readily take place at edge faces of a cut-off portion of the pixel electrode 435 resulting in such fluffs 500 coming into contact with the counter electrode 451 and/or pixel electrode 435, thus leading to creation of re-leakage phenomena.

A further problem lies in association with many disadvantages when compared to transmission-type liquid crystal display apparatus which make the requisite, accurate and reliable defect repairing procedures unavailable, one of which disadvantages is such that the presence of the pixel electrode 435 or else overlying the to-be-corrected portion necessitates laser irradiation at increased power, which can result in destruction in structure of the peripheral section and also in disturbance of an orientation or "alignment" film 453 leading to irregularity in realignment of liquid crystals resulted therefrom, which in turn causes display defects.

SUMMARY OF THE INVENTION

The present invention has been made to solve the problems faced with the prior art, and a primary object of the invention is to provide an improved liquid crystal display apparatus capable of increasing the defect repairing success rate to thereby eliminate reduction of the aperture ratio while increasing manufacturing efficiencies thereof.

To attain the foregoing object the invention provides a liquid crystal display apparatus comprising a pair of substrates disposed opposing each other; a liquid crystal layer sandwiched therebetween; a data signal transmission line for supplying data signals, laid out on one of the substrates; a scan signal transmission line for supplying timing signals, laid out on the one of the substrates, the data signal transmission line and scan signal transmission line being arranged to intersect each other; a thin-film transistor including a gate electrode which is diverted from the scan signal transmission line, electrically connected to the data and scan signal-transmission lines, an interlayer insulating film disposed so as to cover part of the data/scan signal transmission lines and transistor; and a pixel electrode disposed on the interlayer insulating film, the pixel electrode being electrically connected to a drain electrode of the thin film transistor via a contact hole which is provided in the interlayer insulating film, wherein the interlayer insulating film and liquid crystal layer are disposed so as to overlie at least part of the drain electrode.

In accordance with this invention, no pixel electrodes are present overlying at least part of the drain electrode. This ensures that any possible deformation will hardly take place at the pixel electrode when repair is done at a to-be-corrected portion lying within at least part of the drain electrode in order to compensate pixel defects. This in turn guarantees that secondary defects will no longer occur such as undesired contacting of a pixel electrode with portions including its associative opposed or "counter" electrode nor with cross-sectional part of such to-be-corrected portion. In addition, as no pixel electrodes behave to attach to fragments of an insulating film, it becomes possible to eliminate occurrence of defects due to unwanted short-circuiting of the counter electrode with other electrodes associated therewith.

Another advantage is that the absence of any pixel electrode overlying at least part of the drain electrode makes it possible to perform at reduced laser power the intended cutting processes of to-be-corrected portions lying within at least part of the drain electrode. This in turn makes it possible to reduce or minimize the risk of destruction of the structure of surrounding portions of the to-be-cured portion while at the same time greatly suppressing display defects or failures due to disturbance of realignment of liquid crystals which can otherwise occur due to disturbance of an alignment film used.

In the invention it is preferable that the pixel electrode is provided with an opening formed in a region thereof on at least part of the drain electrode.

According to the invention, since the opening is disposed on at least part of the drain electrode, the pixel electrode is securely prevented from being disposed on part of the drain electrode to be a to-be-cured portion in repairing a pixel defect, even in the case where the pixel electrode partly overlie the drain electrode. This in turn securely avoids pixel defects and image visualization failures otherwise occurring due to secondary defects in association with repair of pixel defect and also inadvertent electrical conduction of a counter electrode with other electrodes associated therewith.

In the invention it is preferable that the opening of the pixel electrode is formed so as to contact with an outer periphery of the pixel electrode.

According to the invention, since the opening of the pixel electrode is disposed in a specified region on at least part of the drain electrode and is formed in contact with the outer periphery of the pixel electrode, it is possible to utilize as part of the pixel electrode's opening overlying the to-be-corrected portion a region that does not contribute to displaying such as those between neighboring pixel electrodes, i.e. a region in which any pixel electrodes and interlayer insulating films do not inherently present, which in turn enables suppression of pixel-electrode area reduction while at the same time improving the resultant aperture ratio.

In addition, because during formation (patterning) of this pixel electrode the region with no contribution to displaying operations including but not limited to those portions lying between neighboring pixel electrodes are continuous with the opening of the pixel electrode overlying the to-be-corrected portion, it is possible to facilitate removal of residual pixel-electrode materials in these regions, which in turn enables effectuation of excellent patterning processes of pixel electrodes.

In the invention it is preferable that a to-be-corrected portion is formed in at least part of the drain electrode by narrowing the width of the electrode.

According to the invention, the to-be-corrected portion is formed in the drain electrode as a portion to be corrected in repair of pixel defect. Since the width of the to-be-corrected portion is narrower than that of the drain electrode, the to-be-corrected portion can be easily cut, with the result that the repair of pixel defect is further facilitated.

In the invention it is preferable that the interlayer insulating film is provided with an opening formed in a region thereof on at least part of the drain electrode.

According to the invention, none of the pixel electrodes and interlayer insulating films are present over at least part of the drain electrode. Whereby, in the event a to-be-corrected portion within at least part of the drain electrode is corrected, the one with its drain electrode at such to-be-corrected portion being attached to fragments of the interlayer insulating film will no longer be generated. Thus, re-leakage at cutaway portions will hardly take place. Further, the absence of any interlayer insulating films makes it possible to cut away at least part of the drain electrode by using laser light of low power.

The invention provides a liquid crystal display apparatus comprising a pair of substrates disposed opposing each other; a liquid crystal layer sandwiched therebetween; a data signal transmission line for supplying data signals, laid out on one of the substrates; a scan signal transmission line for supplying timing signals, laid out on the one of the substrates, the data signal transmission line and scan signal transmission line being arranged to intersect each other; a thin-film transistor including a gate electrode which is diverted from the scan signal transmission line, electrically connected to the data and scan signal transmission lines; an interlayer insulating film disposed so as to cover part of the data/scan signal transmission lines and transistor; and a pixel electrode disposed on the interlayer insulating film, the pixel electrode being electrically connected to a drain electrode of the thin film transistor via a contact hole which is provided in the interlayer insulating film, wherein the interlayer insulating film and liquid crystal layer are disposed so as to overlie at least part of the gate electrode.

According to this invention, no pixel electrodes overlie part of the gate electrode. This ensures that when repair is carried out at a to-be-corrected portion within part of the gate electrode in order to compensate a pixel defect, any deformation of the pixel electrode will no longer occur. This in turn guarantees elimination of secondary defects otherwise occurring in a way such that the pixel electrode can badly behave to come into contact with its opposed electrode and/or the cross-section of the portion being corrected. In addition, since the pixel electrode hardly attempts to attach to fragments of an insulating film, any defects due to conduction with the opposed electrode and other electrodes will by no means take place.

Since no pixel electrodes overlie part of the gate electrode, it becomes possible to make use of low-power laser beams to perform cutaway processes of the to-be-corrected portion within part of the gate electrode. This makes it possible to reduce risks of display defect creation otherwise occurring due to disturbance of liquid crystal realignment as resulted from destruction of the peripheral structure of such portion being corrected and/or disturbance of an alignment film per se.

In the invention it is preferable that the pixel electrode is provided with an opening formed in a region thereof on at least part of the gate electrode.

According to the invention, since the opening is disposed on at least part of the gate electrode, the pixel electrode is securely prevented from being disposed on part of the gate electrode to be a to-be-cured portion in repair of a pixel defect, even in the case where the pixel electrode partly overlie the gate electrode. This in turn securely avoids pixel defects and image visualization failures otherwise occurring due to secondary defects in association with repair of pixel defect and also inadvertent electrical conduction of a counter electrode with other electrodes associated therewith.

In the invention it is preferable that the opening of the pixel electrode is formed so as to contact with an outer periphery of the pixel electrode.

According to the invention, since the opening of the pixel electrode is disposed in a specified region on at least part of the gate electrode and is formed in contact with the outer periphery of the pixel electrode, it is possible to utilize as part of the pixel electrode's opening overlying the to-be-corrected portion a region that does not contribute to displaying such as those between neighboring pixel electrodes, i.e. a region in which any pixel electrodes and interlayer insulating films do not inherently present, which in turn enables suppression of pixel-electrode area reduction while at the same time improving the resultant aperture ratio.

Additionally, because in the event this pixel electrode is fabricated (patterned) both the regions that do not contribute to displaying, such as those lying between neighboring pixel electrodes, and the opening of the pixel electrode overlying the to-be-corrected portion are formed continuously, it is possible to readily remove away pixel electrode materials in these regions, which in turn makes it possible to perform excellent pixel-electrode patterning processes.

In the invention it is preferable that a to-be-corrected portion is formed in at least part of the gate electrode by narrowing the width of the electrode.

According to the invention, the to-be-corrected portion is formed in the gate electrode as a portion to be corrected in the repair of pixel defect. Since the width of the to-be-corrected portion is narrower than that of the gate electrode, the to-be-corrected portion can be easily cut, with the result that the repair of pixel defect is further facilitated.

In the invention it is preferable that the interlayer insulating film is provided with an opening formed in a region thereof on at least part of the gate electrode.

According to the invention, none of the pixel electrodes and interlayer insulating films are present over part of the gate electrode. Whereby, in case a to-be-corrected portion within part of the gate electrode is corrected, any one with its gate electrode at such to-be-corrected portion attached to fragments of the interlayer insulating film will no longer take place. Thus, releakage at cutaway portions will hardly occur. Further, the absence of any interlayer insulating film over part of the gage electrode makes it possible to cut away part of the gate electrode by use of a low-power laser.

The invention also provides a liquid crystal display apparatus comprising a pair of substrates disposed opposing each other; a liquid crystal layer sandwiched therebetween; a data signal transmission line for supplying data signals, laid out on one of the substrates; a scan signal transmission line for supplying timing signals, laid out on the one of the substrates; an auxiliary capacitance line for forming an auxiliary capacitance, the data signal transmission line, scan signal transmission line and auxiliary capacitance line being arranged to intersect each other; a thin-film transistor including a gate electrode which is diverted from the scan signal transmission line, electrically connected to the data and scan signal lines; an interlayer insulating film disposed so as to cover part of the data/scan signal transmission lines and transistor; and a pixel electrode disposed on the interlayer insulating film, the pixel electrode being electrically connected to a drain electrode of the thin film transistor via a contact hole which is provided in the interlayer insulating film, wherein the interlayer insulating film and liquid crystal layer are disposed so as to overlie part of a diverted portion which is diverted from the auxiliary capacitance line.

In accordance with this invention, no pixel electrodes are present overlying at least part of the diverted portion which is diverted from the auxiliary capacitance line. This ensures that any possible deformation will hardly take place at the pixel electrode when repair is done at a to-be-corrected portion lying within the diverted portion of the auxiliary capacitance line in order to compensate pixel defects. This in turn guarantees that secondary defects will no longer occur such as undesired contacting of a pixel electrode with portions including its associative opposed or "counter" electrode nor with cross-sectional part of such to-be-cured portion. In addition, as no pixel electrodes behave to attach to fragments of a insulating film, it becomes possible to eliminate occurrence of defects due to unwanted short-circuiting of the counter electrode with other electrodes associated therewith.

Since no pixel electrodes overlie the diverted portion of the auxiliary capacitance line, it is possible to use low-power laser beams to perform cut-and-separate processes of the to-be-corrected portion within the diverted portion. This makes it possible to reduce risks of display defect creation otherwise occurring due to disturbance of liquid crystal realignment as resulted from destruction of the peripheral structure of such portion being corrected and/or disturbance of an alignment film per se.

In the invention it is preferable that the pixel electrode is provided with an opening formed in a region on part of the diverted portion of the auxiliary capacitance line.

According to the invention, the opening of the pixel electrode is placed over certain part of the diverted portion of the auxiliary capacitance line so that even if the pixel electrode partially overlaps the diverted portion, it becomes possible to reliably prevent the pixel electrode from being laid out over part of the diverted portion to be cut away during pixel defect repairing processes. This in turn enables elimination of defects or failures including but not limited to secondary defects during such repair of pixel defect, pixel defects due to unwanted electrical conduction with the opposed electrode and other electrodes, and display deficiencies or defects.

In the invention it is preferable that the opening of the pixel electrode is formed so as to contact with an outer periphery of the pixel electrode.

In accordance with the invention, since the pixel electrode is provided with the opening formed in a region on part of the diverted portion of the auxiliary capacitance line while the opening is formed so as to contact with the outer periphery of the pixel electrode, it becomes possible to utilize as part of the opening of the pixel electrode overlying the to-be-corrected portion a region that does not contribute to image visualization such as those between neighboring pixel electrodes, i. e. the region in which any pixel electrodes and interlayer insulating films do not inherently present. This in turn enables suppression of pixel-electrode area reduction while simultaneously improving the resultant aperture ratio.

Additionally, because in the case where this pixel electrode is fabricated (patterned) both the regions that do not contribute to displaying, such as those lying between neighboring pixel electrodes and the opening of the pixel electrode overlying the to-be-corrected portion are formed continuously, it is possible to readily remove away pixel electrode materials in these regions, which in turn makes it possible to effectuate excellent pixel-electrode patterning processes.

In the invention it is preferable that the interlayer insulating film is provided with an opening formed in a region thereof on part of the diverted portion of the auxiliary capacitance line.

According to the invention, none of the pixel electrodes and interlayer insulating films are present over part of the diverted portion of the auxiliary capacitance line. Whereby, in the case where a to-be-corrected portion within part of the diverted portion is corrected, any one with its diverted portion at such to-be-corrected portion being attached to fragments of the interlayer insulating film will no longer take place. Thus, releakage at cutaway portions will hardly occur. Further, the absence of any interlayer insulating film over part of the diverted portion makes it possible to cut away part of the diverted portion by using low-power laser.

The invention also provides a liquid crystal display apparatus comprising a pair of substrates disposed opposing each other; a liquid crystal layer sandwiched therebetween; a data signal transmission line for supplying data signals, laid out on one of the substrates; a scan signal transmission line for supplying timing signals, laid out on the one of the substrates, the data signal transmission line and scan signal transmission line being arranged to intersect each other; a thin-film transistor including a gate electrode which is diverted from the scan signal transmission line, electrically connected to the data and scan signal transmission lines; an interlayer insulating film disposed so as to cover part of the data/scan signal transmission lines and transistor; and a pixel electrode disposed on the interlayer insulating film, the pixel electrode being electrically connected to a drain electrode of the thin film transistor via a contact hole which is provided in the interlayer insulating film, wherein the pixel electrode is provided with an opening formed at a specified location nearest to a data signal transmission line at an outer periphery of the pixel electrode.

According to the invention, since the opening is formed at the pixel electrode and is in contact with the outer periphery of a location nearest to a data signal transmission line of the pixel electrode, no pixel electrodes exist in the region spanning from a portion overlying the data signal transmission line up to the outer periphery of the position whereat the pixel electrode is nearest to the data signal transmission line. Whereby, the pixel electrode will no longer experience any deformation in case the data signal transmission line is cut for repair of line defects and/or bright dot defects. Thus, it is possible to improve the aperture ratio while at the same time enabling elimination of defects or failures including, but not limited to, secondary defects during such repair of pixel defect, pixel defects due to unwanted electrical conduction with the opposed electrode and other electrodes, and display deficiencies or defects.

In the invention it is preferable that the opening of the pixel electrode is in contact with a specific location at which the pixel electrode is nearest to the outermost data signal transmission line, and is formed in a region on at least part of the drain electrode.

According to the invention, any pixel electrode is absent in the region spanning from the portion overlying the data signal transmission line up to the outer periphery of the position whereat the pixel electrode is in close proximity to the data signal transmission line and also in the region corresponding to the location overlying at least part of the drain electrode. In this case the opening acts as both an opening overlying a to-be-corrected portion of the data signal transmission line and an opening overlying a to-be-corrected portion of the drain electrode, which makes it possible to further suppress reduction of the aperture ratio of the liquid crystal display apparatus.

The invention also provides a liquid crystal display apparatus comprising a pair of substrates confronting each other; a liquid crystal layer sandwiched therebetween; a data signal transmission line disposed on one of the substrates; a switching element disposed on the one substrate; an interlayer insulating film formed so as to cover at least part of the data signal transmission line and switching element; and a pixel electrode disposed on the interlayer insulating film; the switching element being interposed between the data signal transmission line and the pixel electrode, the pixel electrode being electrically connected to the switching element via a contact hole formed in the interlayer insulating film, wherein the pixel electrode is disposed in a residual region other than a region on a to-be-corrected portion when correcting pixels within parts or components disposed between the interlayer insulating film and the one substrate.

As apparent from the foregoing, in accordance with this invention, a liquid crystal display apparatus of the active matrix type is specifically arranged so that no pixel electrodes are laid out in the region corresponding to the location overlying a to-be-corrected portion within parts or components between the interlayer insulating film and the one substrate. This ensures that any pixel electrode deformation no longer takes place even where a to-be-corrected portion is cut away through laser irradiation. This in turn guarantees avoidance of any possible secondary defects otherwise occurring due to the pixel electrode's attempting to come into contact with its associated opposed or "counter" electrode and/or the cross-section of such portion being corrected. In addition, because the electrically conductive pixel electrode hardly attaches to fragments of the interlayer insulating film, defects due to conduction with the counter electrode and other electrodes will no longer take place.

The absence of any pixel electrode makes it possible to perform the intended cutaway process at low laser power, which in turn enables minimization of risks of display defect creation otherwise occurring due to disturbance of liquid crystal realignment as resulted from destruction of the peripheral structure and/or disturbance of an alignment film.

Furthermore, in case the pixel electrode and interlayer insulating film are absent in a specific location overlying the to-be-corrected portion, any one with its diverted portion at such to-be-corrected portion attached to fragments of the interlayer insulating film will never take place. Thus, releakage at cutaway portions will hardly occur. Further, the absence of any interlayer insulating film in this portion makes it possible to cut away part of the to-be-corrected portion by using low-power laser.

BRIEF DESCRIPTION OF THE DRAWINGS

Other and further objects, features, and advantages of the invention will be more explicit from the following detailed description taken with reference to the drawings wherein:

FIG. 28A is a plan view diagram showing one prior known liquid crystal display apparatus whereas

FIG. 29A is a plan view diagram showing one prior art liquid crystal display apparatus whereas

DETAILED DESCRIPTION OF THE PREFERRED EMBODIMENTS

Figure 1:
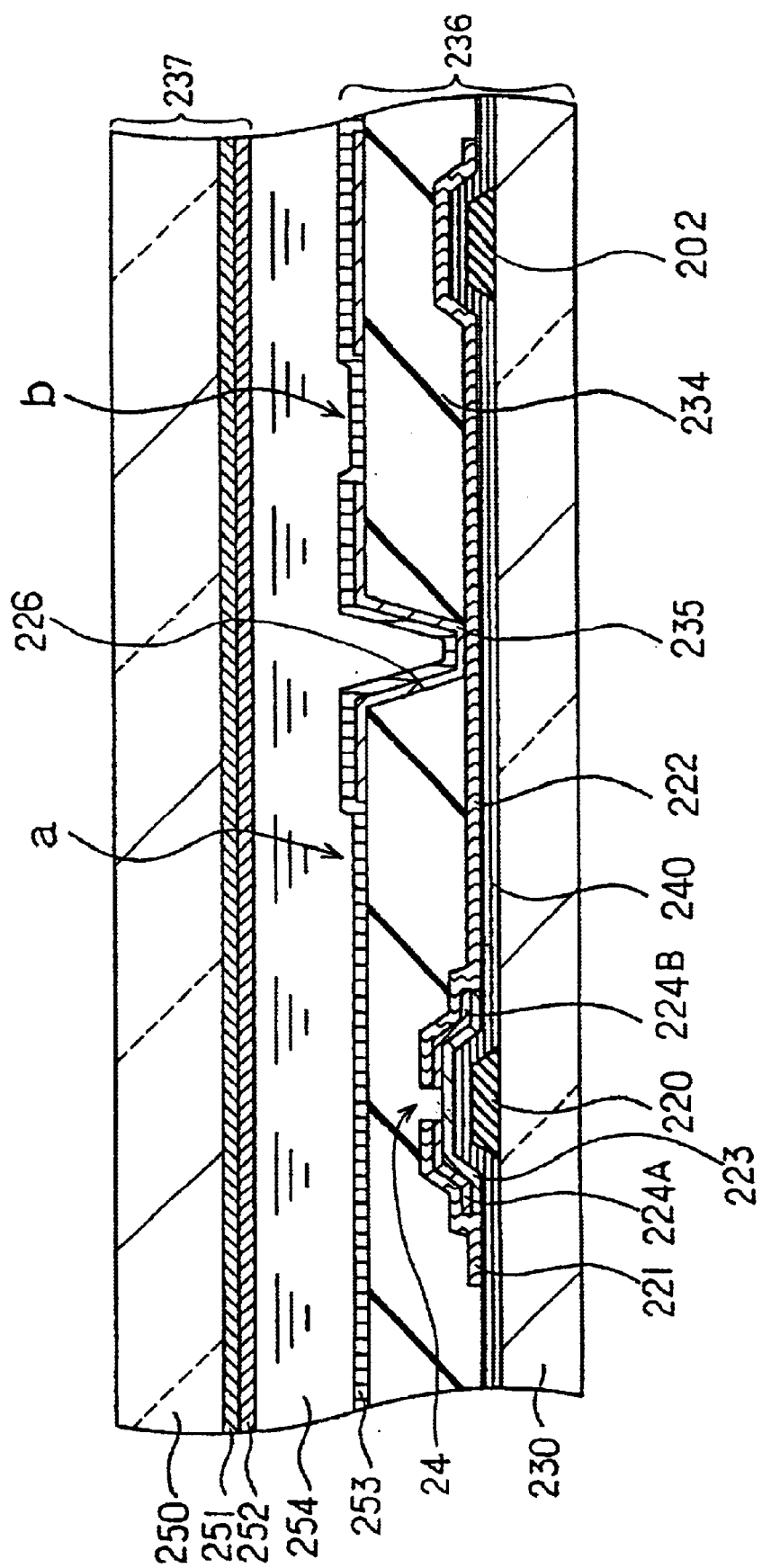
FIG. 1 is a diagram showing an enlarged cross-sectional view of part of a liquid crystal display apparatus in accordance with an embodiment 1, which corresponds to a one-pixel region along with its surrounding or nearby portions.

Now referring to the drawings, preferred embodiments of the invention are described below.

(Embodiment 1: Cs on Gate/Normally black)

Figure 2:
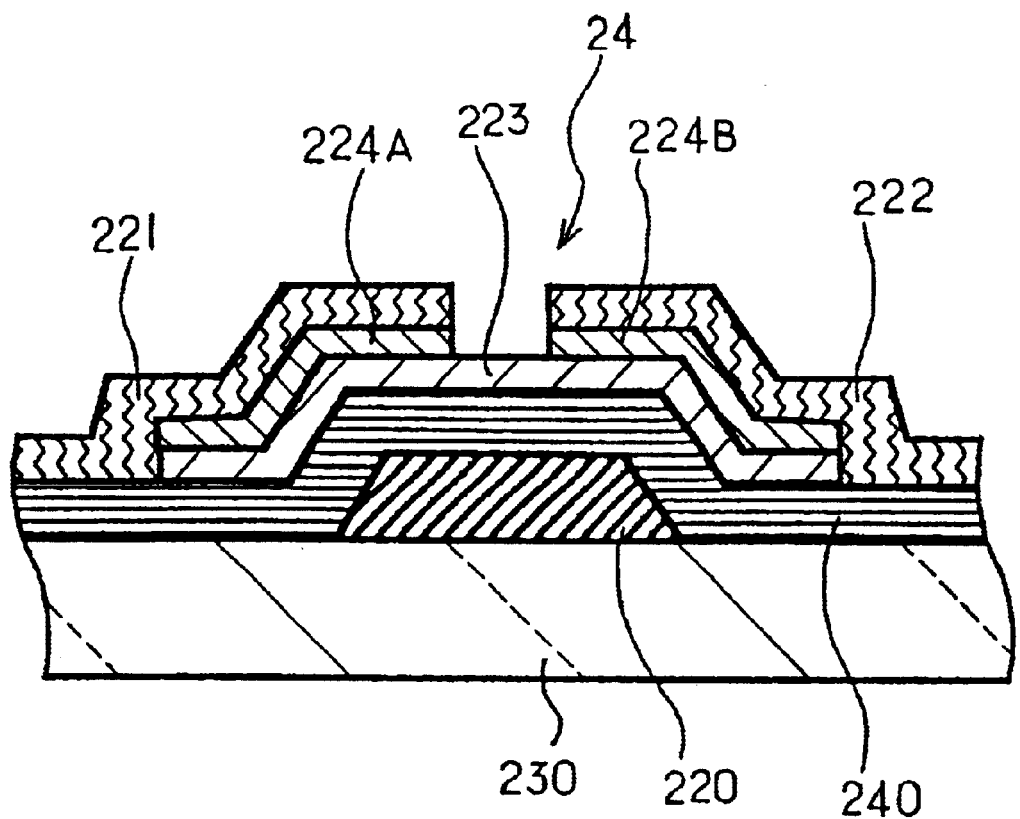
FIG. 2 is a diagram showing an enlarged cross-sectional view of a TFT 24 used in the liquid crystal display apparatus of FIG. 1.
Figure 3:
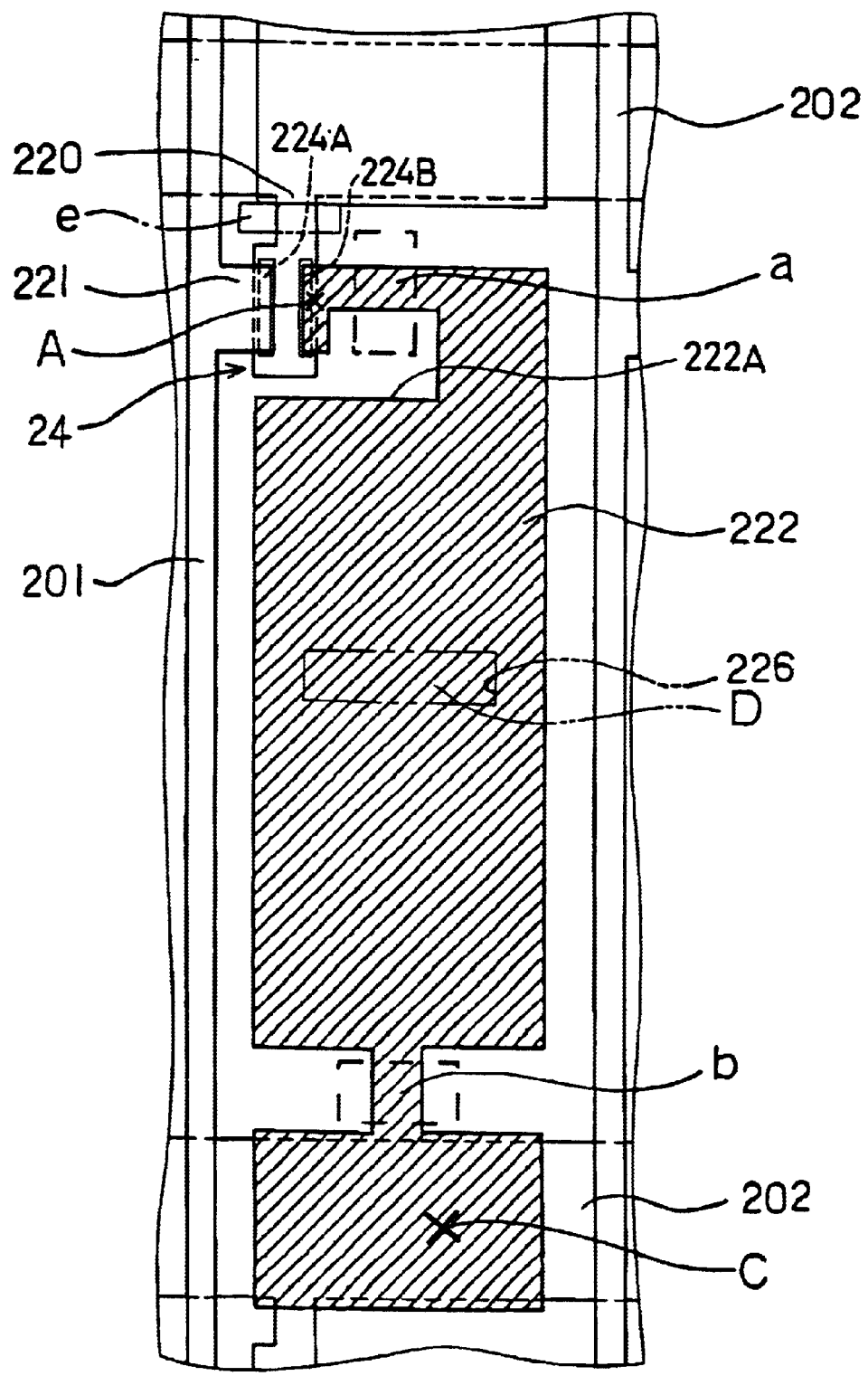
FIG. 3 illustrates an enlarged plan view of a TFT 24 and data signal transmission lines 201 along with scan signal transmission lines 202 in the one-pixel part and its nearby portions of the liquid crystal display apparatus of FIG. 1.
Figure 4:
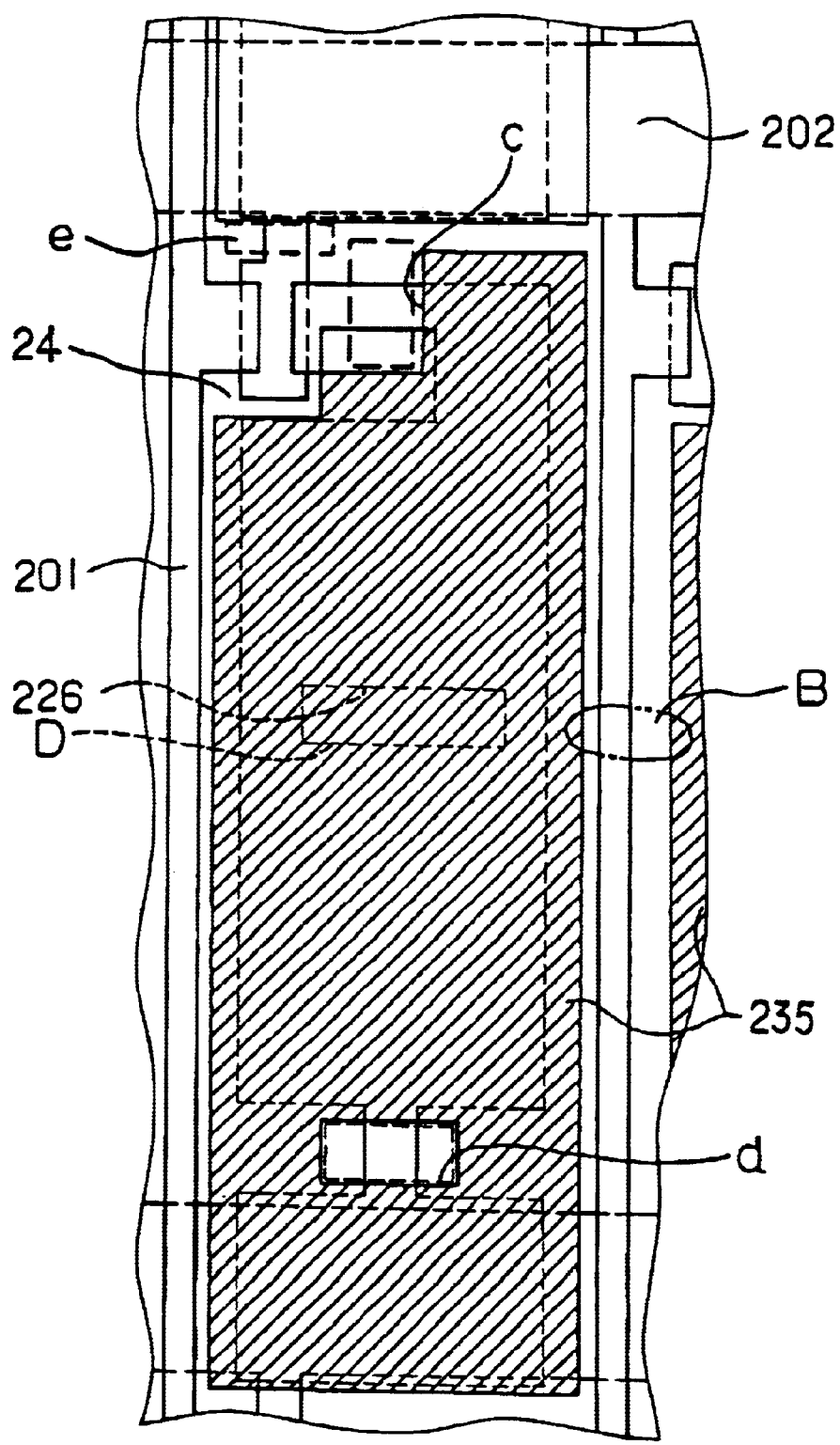
FIG. 4 depicts an enlarged plan view of a TFT 24 and data signal transmission lines 201 along with scan signal transmission lines 202 as well as a pixel electrode 235 in the one-pixel part and its nearby portions of the liquid crystal display apparatus of FIG. 1.

FIG. 1 illustrates, in enlarged cross-section, part of a liquid crystal display apparatus in accordance with an embodiment 1 of the present invention, including a certain region corresponding to one picture element or "pixel" along with its nearby portions; FIG. 2 depicts a cross-sectional view of a TFT used in the liquid crystal display apparatus; FIG. 3 shows an enlarged plan view of the one-pixel region of the liquid crystal display apparatus of FIG. 1 with a TET, a data signal transmission line and a scan signal transmission line associated therewith; and, FIG. 4 is a similar enlarged plan view of the arrangement shown in FIG. 3 with a pixel electrode added thereto. The liquid crystal display apparatus of FIG. 1 is arranged to operate in a normally-black mode.

As better shown in FIG. 1, this liquid crystal display apparatus includes a pair of upper and lower substrates 250 and 230 with a liquid crystal layer 254 sandwiched therebetween. One of the substrates—here, lower substrate 230—has a surface on which scan signal transmission lines 202 (see FIG. 3) are provided along with a gate electrode 220 as diverted from a corresponding one of the scan signal transmission lines 202. A gate insulation film 240 is disposed overlying them over almost the entire surface of the substrate. A data signal transmission line 201 is further provided on the gate insulation film 230. The longitudinal direction of the scan signal transmission lines 202 crosses or intersects the elongate direction of data signal transmission line 201 when looking at from the normal direction of the lower substrate 230. A TFT 24 is provided adjacent to the crossover point of scan signal transmission line 202 and data signal transmission line 201. The TFT 24 includes a gate electrode 220, source electrode 221, drain electrode 222, and two contact layers 224A, 224B. The gate electrode 220 of TET 24 is connected to periodically receive a gate signal via the scan signal transmission lines 202. Scan signal transmission lines 202 are different from one another in timing of gate signal sent thereto. Each gate signal is for use in driving for control of TET 24.

Note that in the description, the gate insulation film 230 and an interlayer insulating film 234 as well as an opposed substrate which are to be described later are not depicted in enlarged partial plan views of liquid crystal display apparatus in the accompanying drawings. In the case where a pixel electrode 235 is illustrated in an enlarged partial plan view of liquid crystal display apparatus such as in FIG. 4, hatching is added to the pixel electrode 235; when the pixel electrode 235 is eliminated from the drawing such as in FIG. 3, the drain electrode 222 is indicated with hatching made using regularly spaced oblique parallel lines added thereto.

A semiconductor layer 223 is provided at a formation part of the TFT 24 overlying the gate insulation film 240, on which layer two contact layers 224A, 224B are formed in such a manner that these are separated on the semiconductor layer 223. Provided thereon is the source electrode 221 which partly overlaps one contact layer 224A while the drain electrode 222 is provided partly overlapping the other contact layer 224B. As shown in FIG. 3 the source electrode 221 is so provided as to be diverted from the data signal transmission line 201. In view of the fact that an edge of the drain electrode 222 on the side of the scan signal transmission line 202 is such that the gate insulation film 240 is present between the scan signal transmission line 202 and drain electrode 222, the drain electrode 222 overlaps the scan signal transmission line 202. An auxiliary capacitor section is formed at the overlap portion with the scan signal transmission line 202, i.e. the neighboring scan signal transmission line which is used for use in sending forth a gate signal at one-prior timing than another scan signal transmission line 202 to which the TFT 24 including this drain electrode 222 is connected. This auxiliary capacitor section is arranged to have what is called the "Cs on-gate/normally black" structure. On the other hand, a side edge of the drain electrode 222 facing the data signal transmission line 201 is such that the drain electrode 222 is formed at the same level as the data signal transmission line 201 at the same process step Thus, this side edge of drain electrode 222 is spaced apart from the data signal transmission line 201 at a distance which eliminates any possible electrical short-circuiting.

An interlayer insulating film 234 is formed over almost the entire substrate surface to overlie the parts or components stated above, while providing a contact hole 226 at a location overlying the drain electrode 222 at this interlayer insulating film 234. A pixel electrode 235 is provided on the interlayer insulating film 234 in a manner such that part of this pixel electrode 235 is filled into the contact hole 226 for electrical interconnection with the drain electrode 222. A fabrication area of the pixel electrode 235 is indicated by hatching in FIG. 4. An orientation or "alignment" film 253 is formed overlying the components thus arranged.

In the liquid crystal display apparatus of FIG. 1, the one substrate 230 with the above components mounted thereon is called an active matrix substrate 236 in the art to which the invention pertains. Note that FIG. 1 shows one pixel part and its nearby portion of the liquid crystal display apparatus. FIGS. 3 and 4 show a one-pixel portion of such one substrate 230 of the liquid crystal display apparatus. With the layout of all the components in the region shown in FIG. 4 being as a unit, the all components are recurrently formed on the one substrate 230 to thereby fabricate the active matrix substrate 236.

The other (upper) substrate 250 with the liquid crystal layer 254 sandwiched between itself and the lower substrate 230 is provided with a transparent electrode 251 that is made for example of indium-tin-oxide (ITO) for use as an opposed or "counter" electrode, with an alignment film 252 provided thereon. In the liquid crystal display apparatus of FIG. 1, the other substrate 250 along with part made up from all the components 251, 252 on the other substrate are called an opposed or "counter" substrate 237. The active matrix substrate 236 and counter substrate 237 are disposed so that the alignment films 253, 252 are nearest to the liquid crystal layer 254.

The drain electrode 222 is formed into a planar shape shown in FIG. 3. More specifically, the drain electrode 222 has a recess portion 222A which is continuous from the outer edge thereof up to the inside. Provision of the recess 222A permits the drain electrode 222 to constitute a single conductive path. In the description an edge side of the drain electrode 222 which overlaps the contact layer 224B is assumed as the upstream of such conductive path while letting the other edge side of drain electrode 222 overlapping the scan signal transmission line 202 be assumed as the downstream of the conductive path. The contact hole 226 is placed at a midway portion of the drain electrode 222 that constitutes a single conductive path for allowing the pixel electrode 235 and drain electrode 222 to be electrically connected together via the contact hole 226. Here, such part whereat the electrical connection is made will be referred to as an electrical connection section D. The drain electrode 222 has to-be-corrected portions (e.g. potential correction sites) a, b, one of which positions is on the conductive-path upstream side which is on the TFT 24 side of the electrical connection section D and the other of which is in downstream of electrical connection section D. Note here that the requisite number of such to-be-corrected portions is determinable so that one or more to-be-corrected portions may be provided at each of the conductive-path upstream side and downstream side. In the embodiment 1, the to-be-corrected portion is a neck portion of the drain electrode, having a width narrower than that of the other portions thereof.

The to-be-corrected portions are the ones that are to be processed when correcting a component between the interlayer insulating film 234 and one substrate 230 for repair of pixel defects. The to-be-corrected portions may be formed at least one of the upstream and downstream sides of the electrical connection portion D of the drain electrode 222. The following explanation assumes that to-be-corrected portions are provided in both of the upstream and downstream of the electrical connection portion D of the drain electrode 222. In case a to-be-corrected portion is formed only in either one of the upstream and downstream of the electrical connection portion D of the drain electrode 222, only an arrangement relating to such either one to-be-corrected portion is provided in the liquid crystal display apparatus.

The pixel electrode 235, as shown in FIG. 4, is formed to have openings c, d at those portions of the pixel electrode 235 overlying the to-be-corrected portions a, b of the drain electrode 222, wherein the openings c, d may be holes or cutaways each being the same in area as each to-be-corrected portion a, b. Although apparatus design schemes permit the openings c, d to be substantially the same in area as the underlying to-be-corrected portions a, b, actual implementation requires them to be greater in area than to-be-corrected portions a, b for allowing some margins in the manufacture thereof.

Formation of such two to-be-corrected portions a, b in the drain electrode 222 in the manner stated above makes it possible to achieve repair of defects such as shown in Table 1 even when defects are found in the liquid crystal display apparatus during product test/inspection procedure thereof.

As the liquid crystal display apparatus of the embodiment 1 is designed to operate in the normally black mode, appropriate repair will be done in a way as shown in the normally-black column in Table 1 below.

TABLE 1

Defect Correction Methods depending upon Respective Defect Locations

| Display Mode | | Defect Location | Correction Content |
|---|---|---|---|
| Normally Black | TFT | Point A | Cut a |
| | Pixel Electrode (PE) | Pt, B | Cut a |
| | Down-stream | Pt. C | Cut b |
| | TFT + Down-stream | Pts A + C | Cut a + Cut b |
| | PE + Down-stream | Pts B + C | Cut a + Cut b (of one pixel) |
| | TFT + PE | Pts A + B | Cut a (of one pixel) |
| Normally White | TFT | Pt A | Correction Method #1 below |
| | PE | Pt B | Cut a (of one pixel) |
| | Down-stream | Pt C | Cut b + Method #1 |

TABLE 1-continued

Defect Correction Methods depending upon Respective Defect Locations

| Display Mode | Defect Location | Correction Content |
|---|---|---|
| TFT + Down-stream | Pts A + C | Cut b + Method #1 |
| PE + Down-stream | Pts B + C | Cut a + Cut b (of one pixel) |
| TFT + PE | Pts A + B | Cut a (of one pixel) |

[Correction Method #1]

If any TFT is not formed over a scan signal transmission line, then cut the TFT gate electrode for separation from the scan signal transmission line, and short-circuit the source and drain electrodes via the separated gate electrode.

If a TET is formed over a scan signal transmission line then cut a common branch for separation from a common line thus letting the source and drain electrodes be shorted together via the common branch separated.

[Defect Location]

Point A: Gate electrode and drain electrode are shorted.

Point B: Pixel electrode and its neighboring pixel electrode are shorted.

Point C: Drain electrode and scan signal transmission line (or, common line) are shorted.

As shown in FIG. 3, in case the gate electrode 220 is electrically shorted with the drain electrode 222 at point A of TFT 24 resulting in operation failure or malfunction of the TFT 24, cut the upstream to-be-corrected portion a. This results in the pixel electrode 235 being cut for separation from the drain electrode 222 to go into an electrically floating state, thereby causing a defective pixel including this pixel electrode 235 to turn off and become an "undriven" cell; thus, it is possible to reduce the on-screen visual recognition of such defect.

Where the drain electrode 222 and its associative scan signal transmission line 202 are electrically shorted together at a point C in the downstream of the conductive path of the electrical connection section D, cut the downstream to-be-corrected portion b for separation. Alternatively, when the pixel electrode 235 and its neighboring pixel electrode 235 are shorted together at a point B as shown in FIG. 4, cut to-be-corrected portions a of drain electrodes 222 which are connected to the both pixel electrodes 235 respectively. Still alternatively, when both the point A of TFT 24 and its downstream point C are shorted, and further when the points A, B and C are all shorted, cut both the upstream downstream to-be-corrected portions a, b.

As any defect that is found during test/inspection procedures is readily correctable or curable by cutting either the upstream to-be-corrected portion a or upstream to-be-corrected portion b by irradiation of a laser beam, any defective pixels that can affect the image displayability such as line defects and/or bright dots will no longer be displayed on the screen of the liquid crystal display apparatus thus corrected. This makes it possible to improve the production efficiency of such liquid crystal display apparatus while increasing manufacturing yields thereof.

Figure 5:
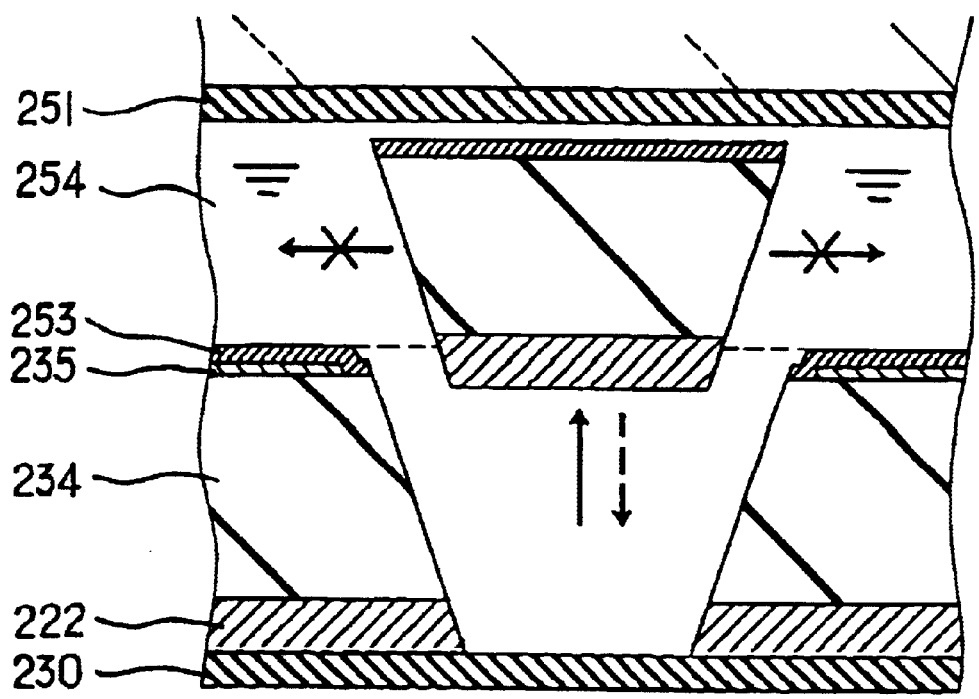
FIG. 5 is a diagram showing a problem occurring in a liquid crystal display apparatus in case the thickness of an interlayer insulating film approximates in value the thickness of a liquid crystal layer.

Further, as shown in FIG. 5, in case the thickness of the interlayer insulating film 234 approximates in value the thickness of liquid crystal layer 254, any one with the drain electrode 222 at the repair portion attached to fragments of the interlayer insulating film 234 at the repair portion will hardly behave to fly out into the liquid crystal layer 254 and thus continue residing at a cutout portion and then return to its original position due to application of vibrations and pressures thereto, which possibly results in occurrence of re-leakage of the cutout portion.

Figure 6:
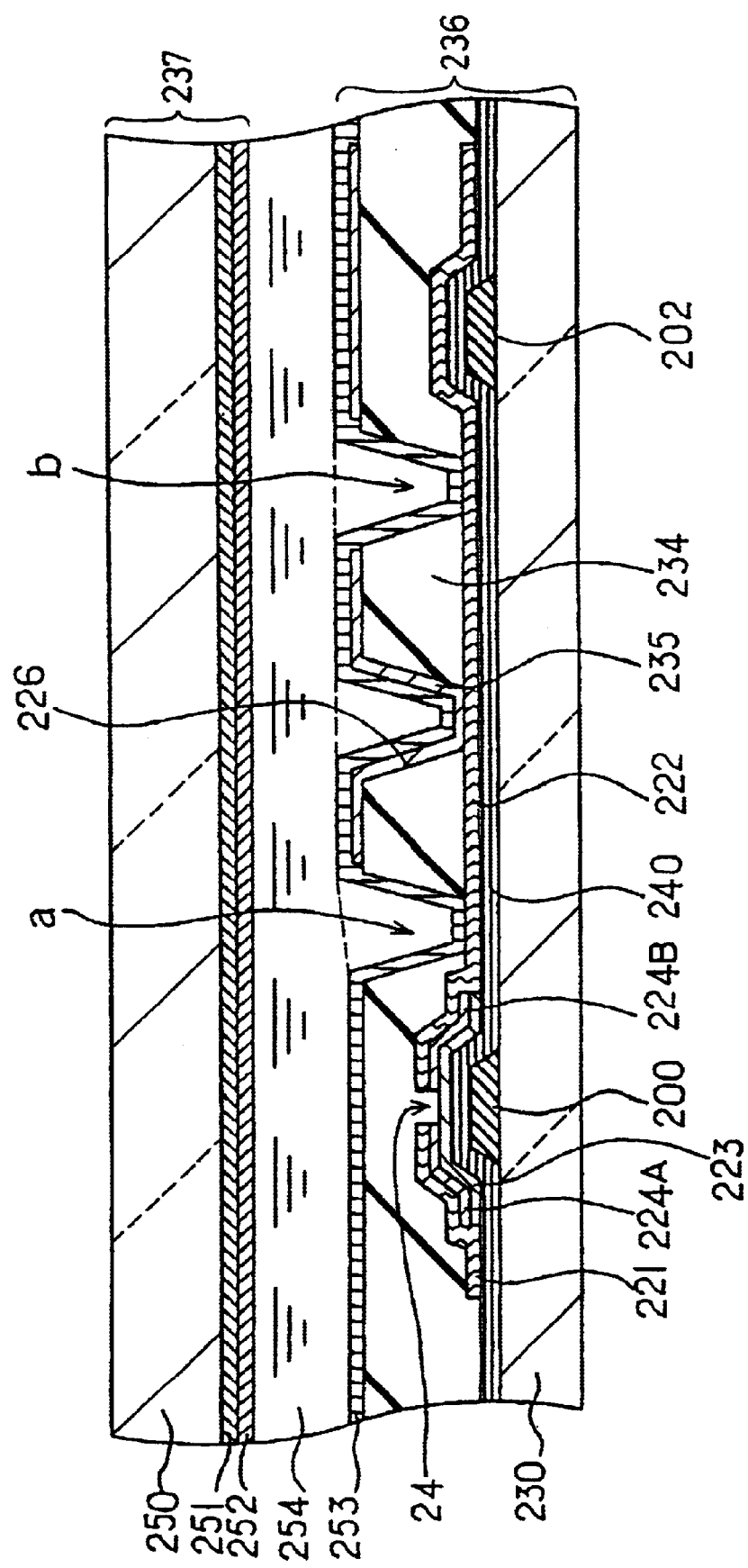
FIG. 6 is a diagram showing an enlarged cross-sectional view of one-pixel part of a liquid crystal display apparatus in accordance with a second embodiment along with its nearby portions, which apparatus is arranged so that no interlayer insulating films are formed over to-be-corrected portions a, b of a drain electrode 222.

In this way, for enabling effectuation of the intended repair even in the liquid crystal display apparatus that is arranged so that the thickness of the interlayer insulating film 234 approximates the thickness of liquid crystal layer 254, the interlayer insulating film 234 is not formed at specified portions lying between the to-be-corrected portions a, b of the drain electrode 222 and the openings c, d of pixel electrode 235 as shown in FIG. 6. The alignment film 253 and liquid crystal layer 254 are stacked or laminated over the to-be-corrected portions a, b of the drain electrode 222. Accordingly, the absence of any interlayer insulating film components makes it possible to achieve the intended cutting processes using laser of low power. The same or similar repair method to that set forth in Table 1 is employable therefor. For embodiments 2 to 5 as will be discussed later in the description, the interlayer insulating film 234 may not be formed at certain location between the drain electrode 222's to-be-corrected portion and its associated opening of the pixel electrode 235 as shown in FIG. 6. In FIG. 4, the region without accompanying the interlayer insulating film 234, i.e. the interlayer insulating film 234's hole, is indicated by broken lines. The region with the interlayer insulating film 234 not being formed therein will be referred to as a "non-formation" region hereinafter.

Note however that it will possibly happen when reduction to practice that thin portions of such interlayer insulating film can reside during manufacturing processes even where apparatus design does not require formation of any interlayer insulating film. If this is the case, similar advantages to the above case are achievable because the interlayer insulating film is thin sufficiently. Additionally, in regard to portions as expected to undergo other cutout repairing proceedings also, it will be permissible that the pixel electrode is not formed whereas the interlayer insulating film is formed; however, formation of the latter is preferably eliminated. With this arrangement also, the same or similar advantages to those stated above are attainable.

(Embodiment 2: Cs on Gate/Normally white)

An embodiment 2 is drawn to the case where the liquid crystal display apparatus of the embodiment 1 is arranged to operate in a normally-white display mode. While FIGS. 3 and 4 are enlarged partial plan views of the liquid crystal display apparatus of the embodiment 1, an arrangement of the liquid crystal display apparatus in the embodiment 2 is similar to that of embodiment 1 except for the following points: its display mode is the normally while mode; a non-formation region e is provided overlapping part of the gate electrode; and, any interlayer insulating film is not formed at a location overlying the upper part of the gate electrode. Although it is permissible that the interlayer insulating film 234 may be also formed in the non-formation region e over the gate electrode 220 as in the non-formation region overlapping the opening of the pixel electrode 235, elimination of formation thereof will be desirable. An explanation will be given with reference to FIGS. 3 and 4.

Correction of this liquid crystal display apparatus of the normally-white mode will be explained on the basis of Table 1 above. In case a defect as found during test/inspection procedures is an electrical shorting between the gate electrode 220 and drain electrode 222 at the point A of the TFT 24 of FIG. 3, a repairing method as has been disclosed in JP-B2 3-55985 is used to perform the intended repair. That method includes the steps of cutting the gate electrode 220 for separation from the scan signal transmission line 202, and then letting the source electrode 221 be electrically shorted with drain electrode 222. This is the repairing method #1 indicated in Table 1. In repairing method #1, a voltage of the average potential of data signals involved is constantly applied to the pixel electrode 235 in any event to ensure that a defective pixel electrode stays less in visual recognition relative to its surrounding portions.

In case the drain electrode 222 and scan signal transmission line 202 are electrically shorted together at the point C in the downstream of the conductive path of the electrical connection section D, the downstream to-be-corrected portion b is cut and simultaneously repair is performed by the repairing method #1. This makes it possible to cut and separate the pixel electrode 235 from the scan signal transmission line 202 resulting in application of a voltage of the average potential of data signals, which in turn causes a defective pixel electrode to decrease in visual recognition relative to its surrounding ones. Alternatively, where both the TFT 24's point A and its downstream point C are shorted, the downstream to-be-corrected portion b is cut while at the same time performing repair using the repairing method #1. Still alternatively, when the pixel electrode 235 is shorted with its neighboring pixel electrode 235 at point B as shown in FIG. 4, to-be-corrected portion a in the upstream of the drain electrode is cut as connected to the pixel electrode 235. If both the upstream point B and downstream point C are shorted, then the upstream and downstream to-be-corrected portions a, b are cut for separation.

With such a repairing procedure, any defects that can affect the display abilities such as line defects and/or bright dots or the like will no longer be visualized on the screen while improving the manufacturing efficiency of the active-matrix liquid crystal display apparatus.

(Embodiment 3: Cs on Common/Normally black)

Whereas the embodiments 1, 2 stated above are arranged to have the "Cs on Gate" structure with the auxiliary capacitor formed on a one-order proceeding scan signal transmission line, embodiment 3 is directed to the case where such auxiliary capacitor is formed on or over a common line that has been formed separately from the scan signal transmission line.

Figure 7:
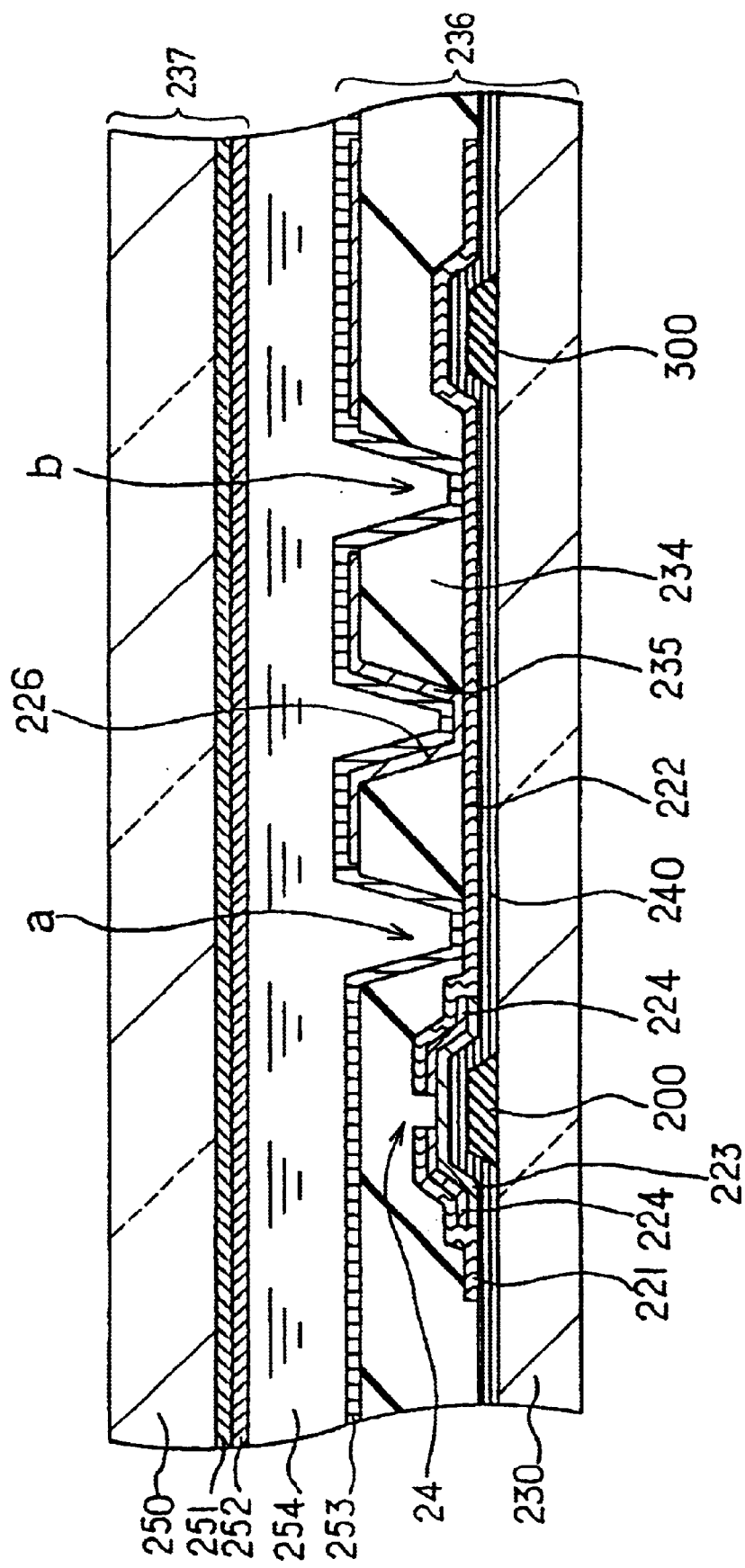
FIG. 7 is a diagram showing a cross-sectional view of a one-pixel region along with its adjacent portions of a liquid crystal display apparatus in accordance with an embodiment 3.
Figure 8:
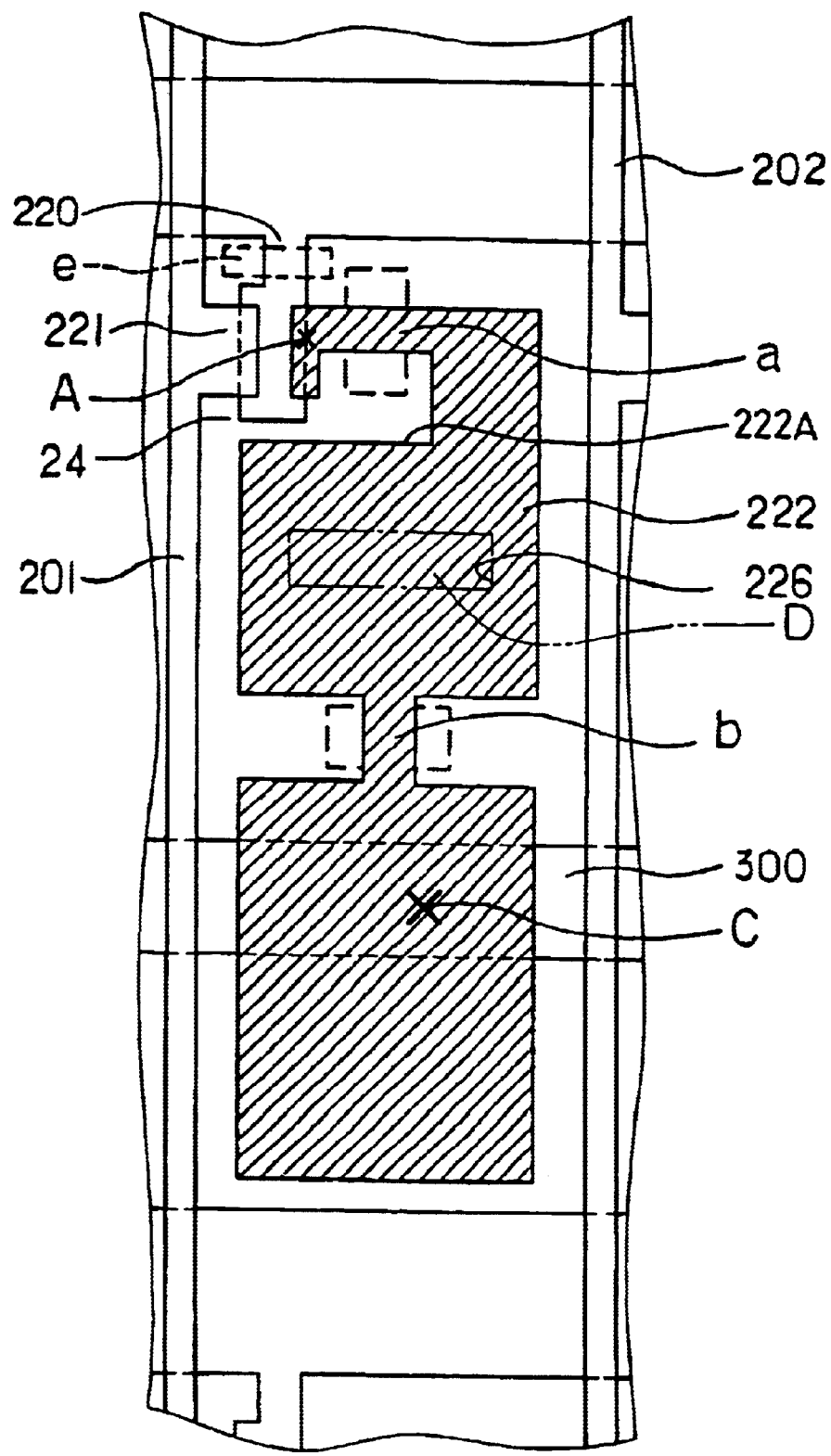
FIG. 8 is an enlarged partial plan view of a TFT 24 and drain electrode 222 plus data signal transmission lines 201 along with scan signal transmission lines 202 in the one-pixel part and its nearby portions of the liquid crystal display apparatus of the embodiment 3.
Figure 9:
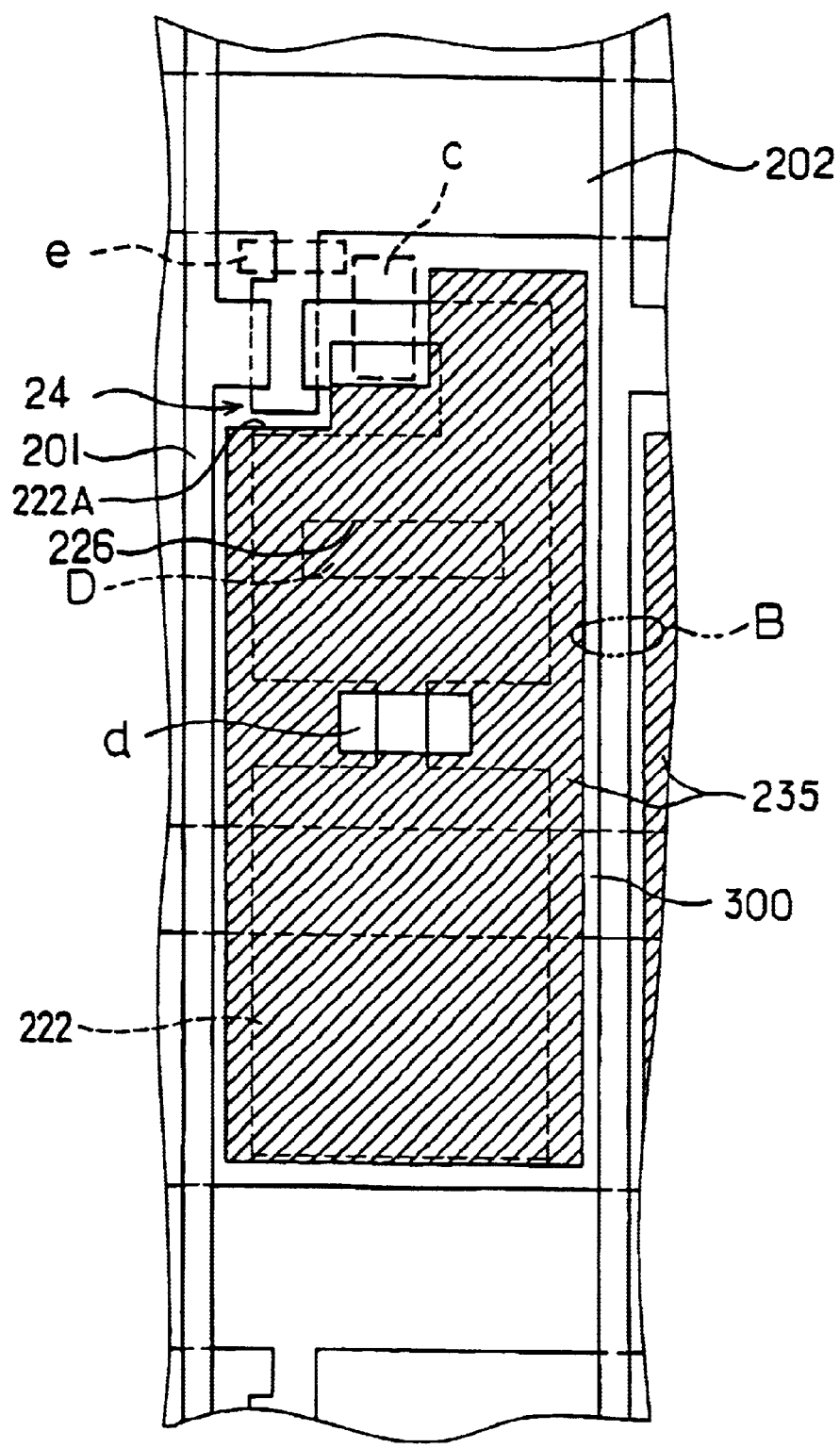
FIG. 9 is an enlarged plan view of a TFT 24 and data signal transmission lines 201 plus scan signal transmission lines 202 as well as a pixel electrode 235 in the one-pixel part and its nearby portions of the liquid crystal display apparatus of FIG. 7.

The third embodiment is similar in structure to the first embodiment with its active matrix substrate being modified as shown in FIGS. 7–9. Note that in the following explanations of liquid crystal display apparatus presented below in the description, those parts or components with the same functionalities used therein will be designated by the same reference characters and any repetitive explanations thereof will be eliminated for purposes of simplification.

FIG. 8 illustrates a plan view of one pixel part of the liquid crystal display apparatus including a TFT, drain electrode, data signal transmission line, and scan signal transmission line. FIG. 9 is a similar plan view with depiction of a pixel electrode added thereto. FIG. 7 is a sectional diagram of the liquid crystal display apparatus in accordance with the third embodiment. The embodiment 3 is arranged so that a common line 300 for auxiliary capacitance is provided independently of the scan signal transmission line 202 and is formed to oppose the drain electrode 222 thereby providing what is called the "Cs on Common" structure. In the drain electrode 222 of the embodiment 3, its downstream-side to-be-corrected portion b is disposed between an electrical connection section D and the auxiliary capacitance common line 300. The remaining arrangements are similar to those in the embodiment 1.

Use of the drain electrode 222 thus arranged makes it possible to perform repair of defects as found in liquid crystal display apparatus products at the test/inspection stage in the manufacture thereof, in a way which follows. In view of the fact that the liquid crystal display apparatus of the embodiment 3 is of normally black mode, appropriate repair will be carried out depending on defect locations as indicated in the normally-black column of Table 1 above.

In case the gate electrode 220 and drain electrode 222 are electrically shorted together at the point A of TFF 24 resulting in malfunction of the TFT 24 as shown in FIG. 7, the upstream to-be-corrected portion a is cut. Thereby the pixel electrode 235 is separated or disconnected from the drain electrode 222 to be in the electrically floating state and then set in the turn-off state, thus enabling reduction or minimization of visual recognition of a defect on the display screen.

Where the drain electrode 222 and common line 300 are shorted together at the point C in the downstream of a conductive path of the electrical connection section D, the downstream to-be-corrected portion b is cut. Alternatively, when a pixel electrode 235 and its neighboring pixel electrode 235 are shorted at the point B as shown in FIG. 8, the upstream to-be-corrected portion a of the drain electrode 222 that is connected to both pixel electrodes is cut. Still alternatively, when both the TFF 24's point A and the downstream point C are shorted, and further when the points A–C are all shorted, both of the upstream and downstream to-be-corrected portions a and b are cut.

In this way, any defects found during test proceedings are readily curable through laser irradiation of the upstream to-be-corrected portion a or downstream to-be-corrected portion b to ensure that any fault that can affect the resulting display characteristics, such as line defects and/or bright dots, will no longer be visualized on the screen, which in turn makes it possible to improve the production efficiency of the active-matrix liquid crystal display apparatus.

(Embodiment 4: Cs on Common/Normally white)

A liquid crystal display apparatus in accordance with an embodiment 4 is of the so called "Cs on Common" type that is operable in the normally white mode, a repairing method of which will be explained in conjunction with Table 1 above. This embodiment is similar in structure to the liquid crystal display apparatus of the embodiment 4 except that the former is designed to operate in the normally white mode, which will be explained with reference to FIGS. 7–8.

In the case where a defect as found during test/inspection procedures is due to an electrical shorting between the gate electrode 220 and drain electrode 222 at the point A of the TFT 24 of FIG. 7, the repairing method as has been disclosed in JP-B2 3-55985 is used to perform the intended repair. That method includes the steps of cutting the gate electrode 220 in its non-formation region e for separation from the scan signal transmission line 202, and then letting the source electrode 221 be electrically shorted with drain electrode 222. This is the repairing method #1 indicated in Table 1. Thereby, a voltage of the average potential of data signals concerned is being constantly applied to the pixel electrode 235 to thereby ensure that a defective pixel electrode stays less in on-screen visual recognition relative to its surrounding portions. In case the drain electrode 222 and common line 300 are electrically shorted together at the point C in the downstream of the conductive path of the electrical connection section D, the downstream to-be-corrected portion b is cut and repair is simultaneously performed by the repairing method #1. This makes it possible to cut and separate the pixel electrode 235 from the common line 300 resulting in application of a voltage of the average potential of data signals to the pixel electrode, which in turn lets a defective pixel electrode be hard to be visually recognized relative to its neighbors.

Alternatively, when the pixel electrode 235 is shorted with its neighboring pixel electrode 235 at point B as shown in FIG. 8, one to-be-corrected portion a in the upstream of the drain electrode 222 is cut as connected to one pixel electrode.

Still alternatively, where both the TFT 24's point A and its downstream point C are shorted, the downstream to-be-corrected portion b is cut while at the same time performing repair using the repairing method #1. If both the upstream point B and downstream point C are shorted then the upstream and downstream to-be-corrected portions a, b are cut for separation.

With such a repairing procedure, any defects that can affect the display ability such as line defects and/or bright dots or the like will no longer be visualized on the screen while increasing the manufacturing efficiency of the liquid crystal display apparatus.

(Embodiment 5: Cs on Common/Normally white)

Figure 10:
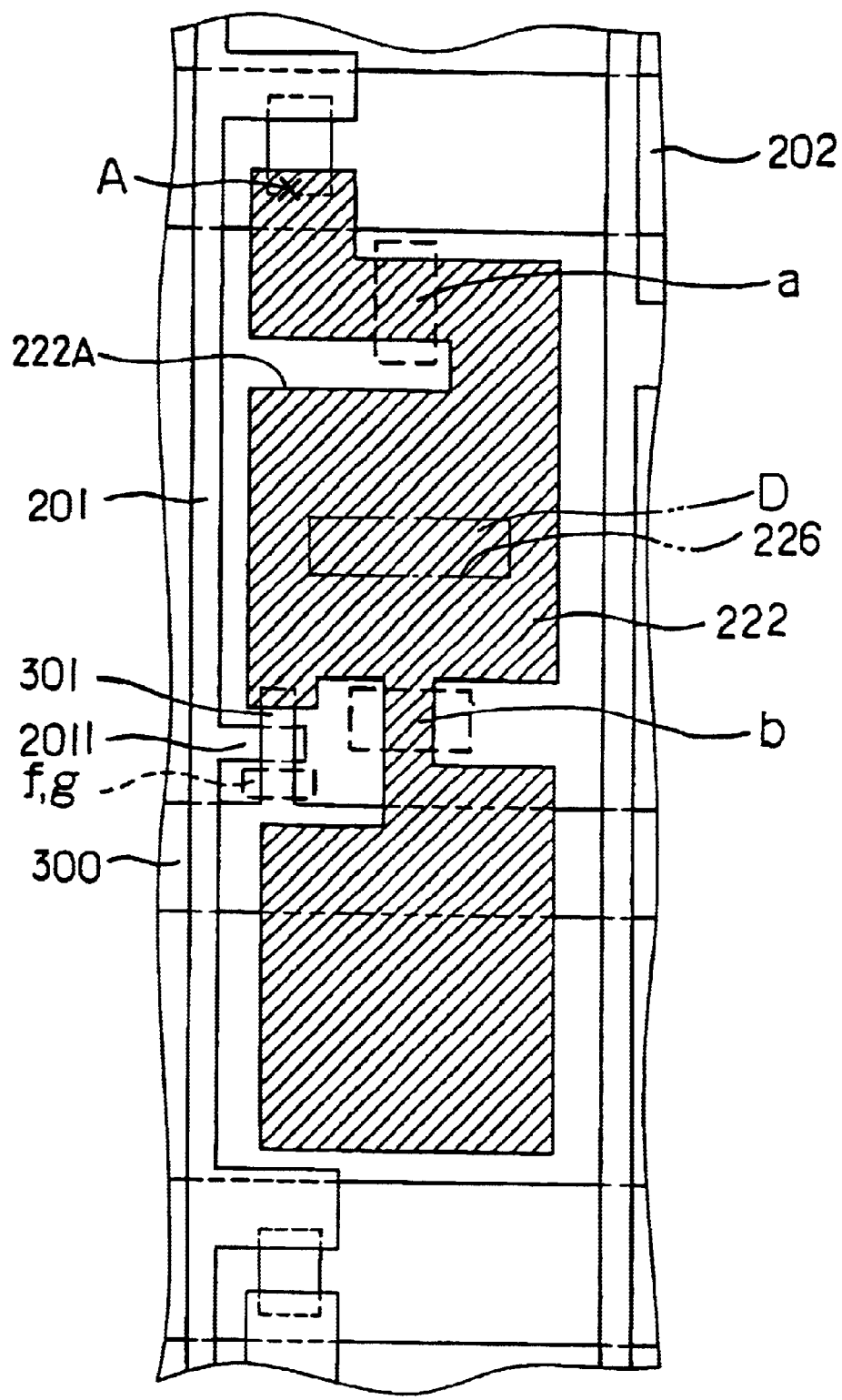
FIG. 10 illustrates an enlarged partial plan view of a TFT 24 and drain electrode 222 plus data signal transmission lines 201 along with scan signal transmission lines 202 in a one-pixel part and its nearby portions of a liquid crystal display apparatus in accordance with an embodiment 5.
Figure 11:
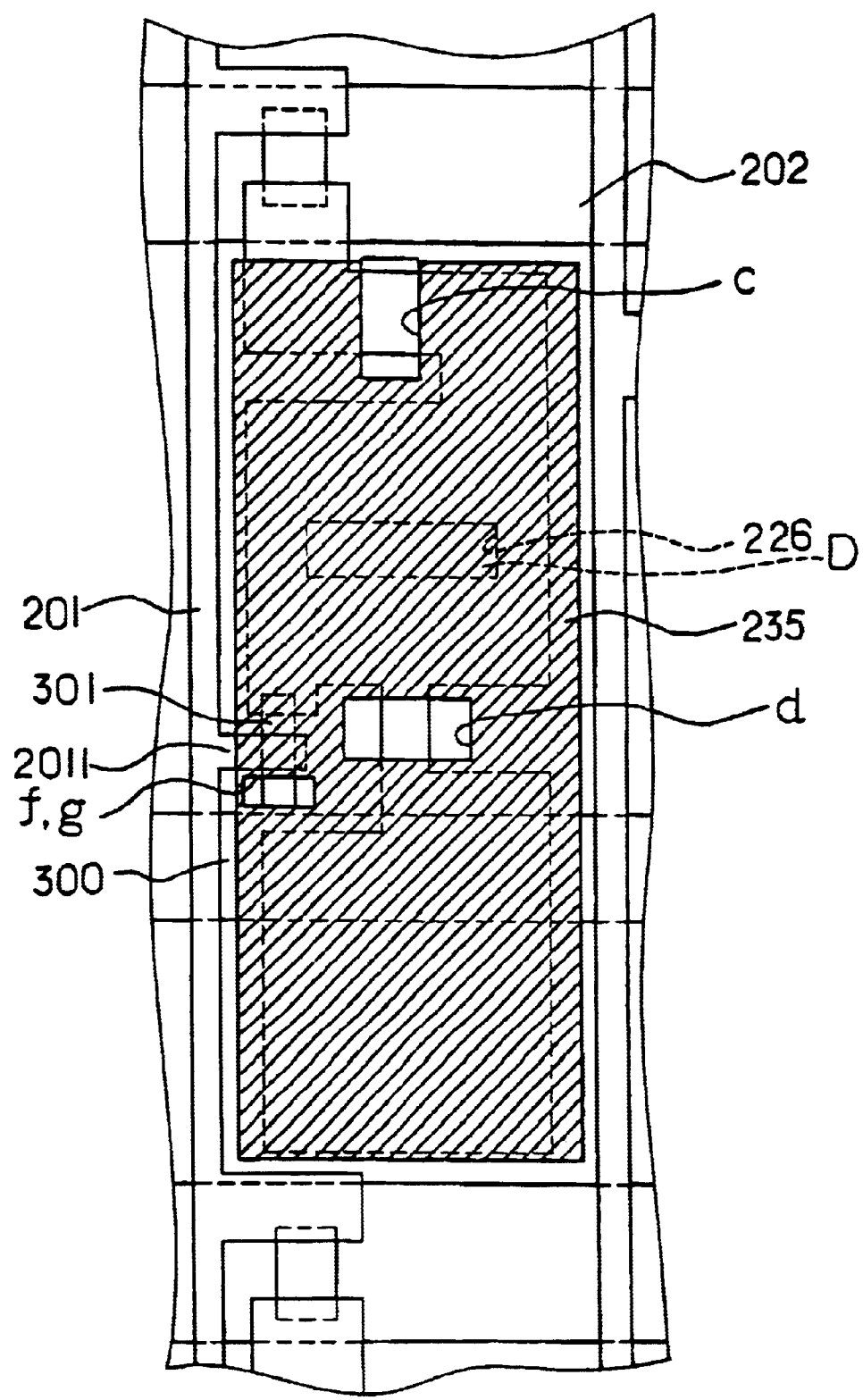
FIG. 11 is an enlarged plan view of the TFT 24 and data signal transmission lines 201 plus scan signal transmission lines 202 as well as a pixel electrode 235 in the one-pixel part and its nearby portions of the liquid crystal display apparatus of FIG. 10.

A liquid crystal display apparatus in accordance with an embodiment 5 is of the so called "Cs on Common" type that is operable in the normally white mode, a repairing method of which will be explained in conjunction with FIGS. 10 and 11 along with Table 1 above. The liquid crystal display apparatus of embodiment 5 is similar in structure to embodiment 3 with the active matrix substrate being modified as shown in FIGS. 10–11.

In embodiment 5 the TFT 24 is formed overlying the scan signal transmission line 202 in order to improve the aperture ratio. More specifically, this embodiment is designed to have the "TFT on Gate" structure. A common branch 301 is diverted from the common line 300 whereas a data branch 2011 is diverted from the data signal transmission line 201. With respect to the common branch 301, the data branch 2011 and drain electrode 222 are laminated over each other with a gate insulation film 240 sandwiched between them. This embodiment is the same in arrangement as the embodiment 3 except that the structure above is employed and that its display is in the normally white mode.

The pixel electrode 235 is so formed as to have an opening f at a specified location overlying an edge portion of the common branch 301 on the side of the common line 300, which opening may be either a hole or a cutaway. An interlayer insulating film 234 is immediately beneath the opening f on the common branch and is formed to have a hole or cutaway portion in a non-formation region g which is the same in area as the non-formation region f. Although the interlayer insulating film 234 may be formed in the non-formation region g on the common branch as in the non-formation region on the to-be-corrected portions a, b, fabrication of such film is preferably eliminated. Preferably the structure above is laid out as closely as possible to the electrical connection section D to ensure that the to-be-corrected portions a, b are useable for repair even when these are separated from each other.

With the liquid crystal display apparatus thus arranged, it becomes possible to correct defects as found during test/inspection proceedings in the manufacture thereof in a way which follows.

In case a defect as found at test/inspection steps is due to an electrical shorting between the gate electrode 220 and drain electrode 222 at the point A of the TFT 24 of FIG. 10, the repairing method as has been disclosed in JP-B2 3-55985 is used to perform repair. That method include the steps of cutting the common branch 301 for separation from the common line 300 at the part immediately underlying the opening f and non-formation region g on the common branch, and then letting the data signal transmission line 201 be electrically shorted with the common branch 301 thus separated, and further letting the drain electrode 222 and the separated common branch 301 be electrically shorted together. This is the repairing method #1 indicated in Table 1. Thereby, a voltage of the average potential of data signals involved is constantly applied to the pixel electrode 235 in any event to ensure that a defective pixel electrode remains less in visual recognition relative to its surrounding portions.

In this way it is possible to cure or correct any defects found through inspection by use of the common branch 301 thus enabling improvement of the manufacturing efficiency of the liquid crystal display apparatus.

Figure 12:
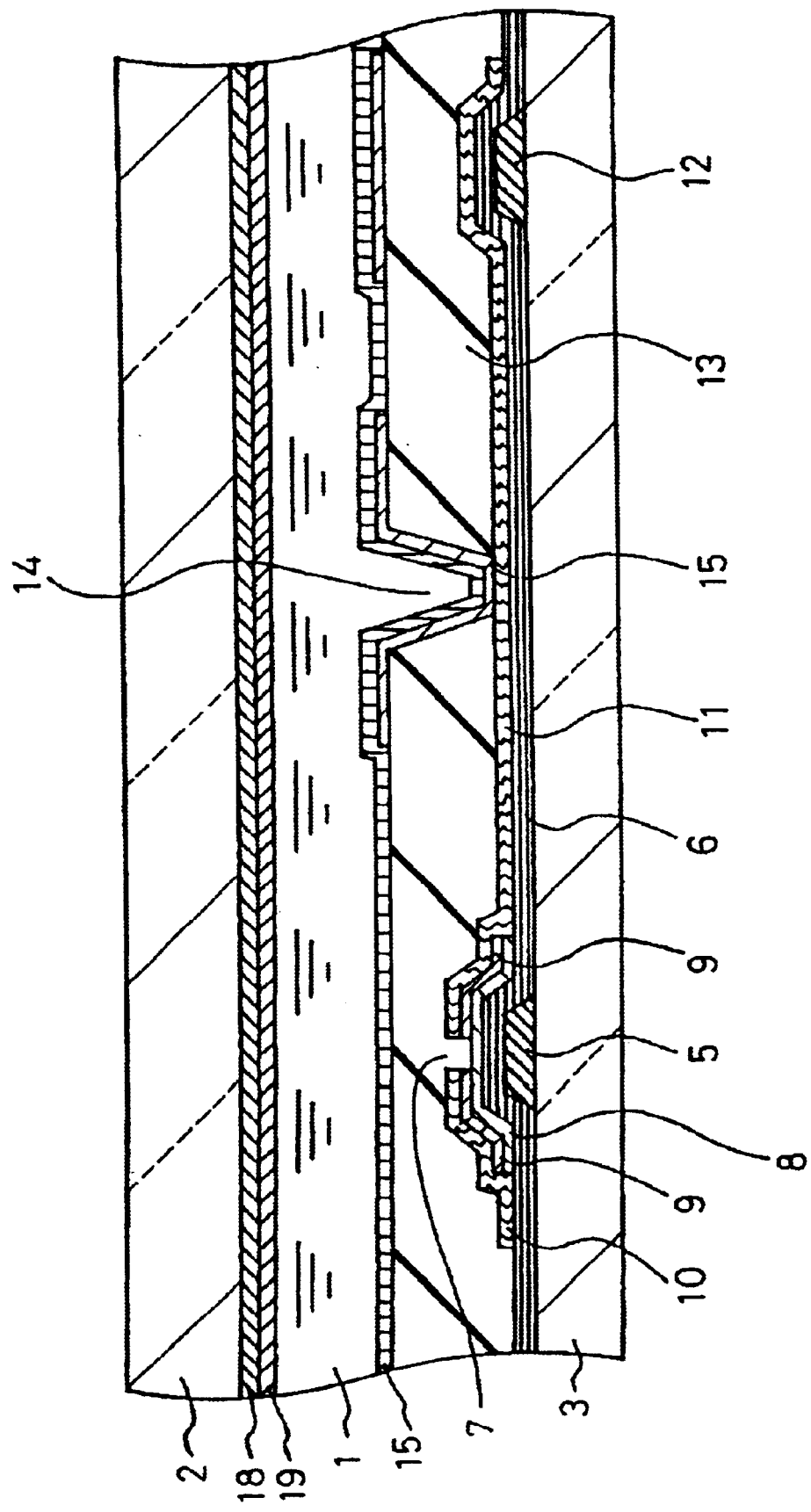
FIG. 12 is an enlarged cross-sectional view of a one-pixel region and its nearby portions of a liquid crystal display apparatus in accordance with an embodiment 6 of the invention.
Figure 13:
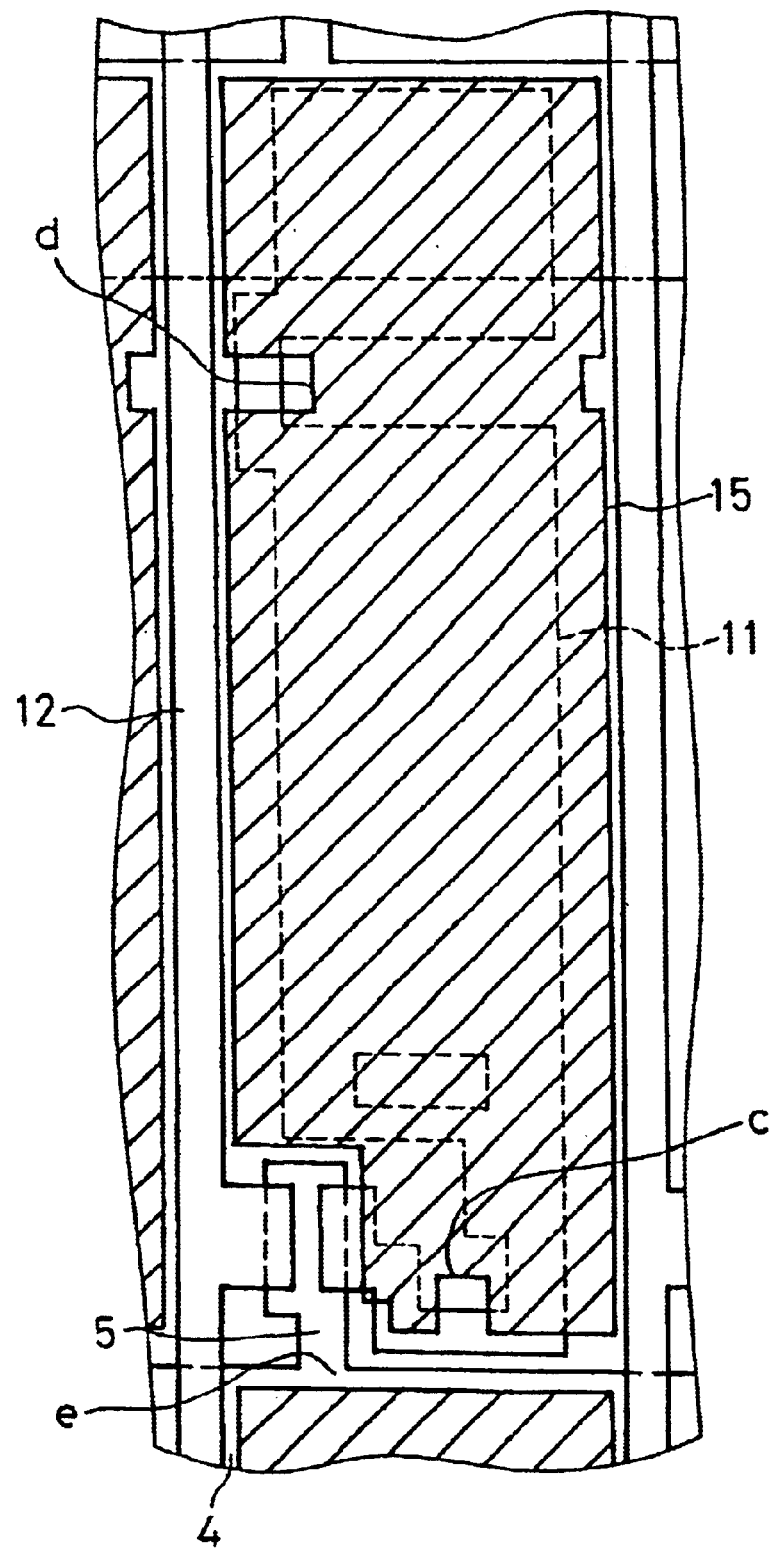
FIG. 13 is an enlarged plan view of the one-pixel region of the liquid crystal display apparatus in accordance with the embodiment 6 of the invention.
Figure 14:
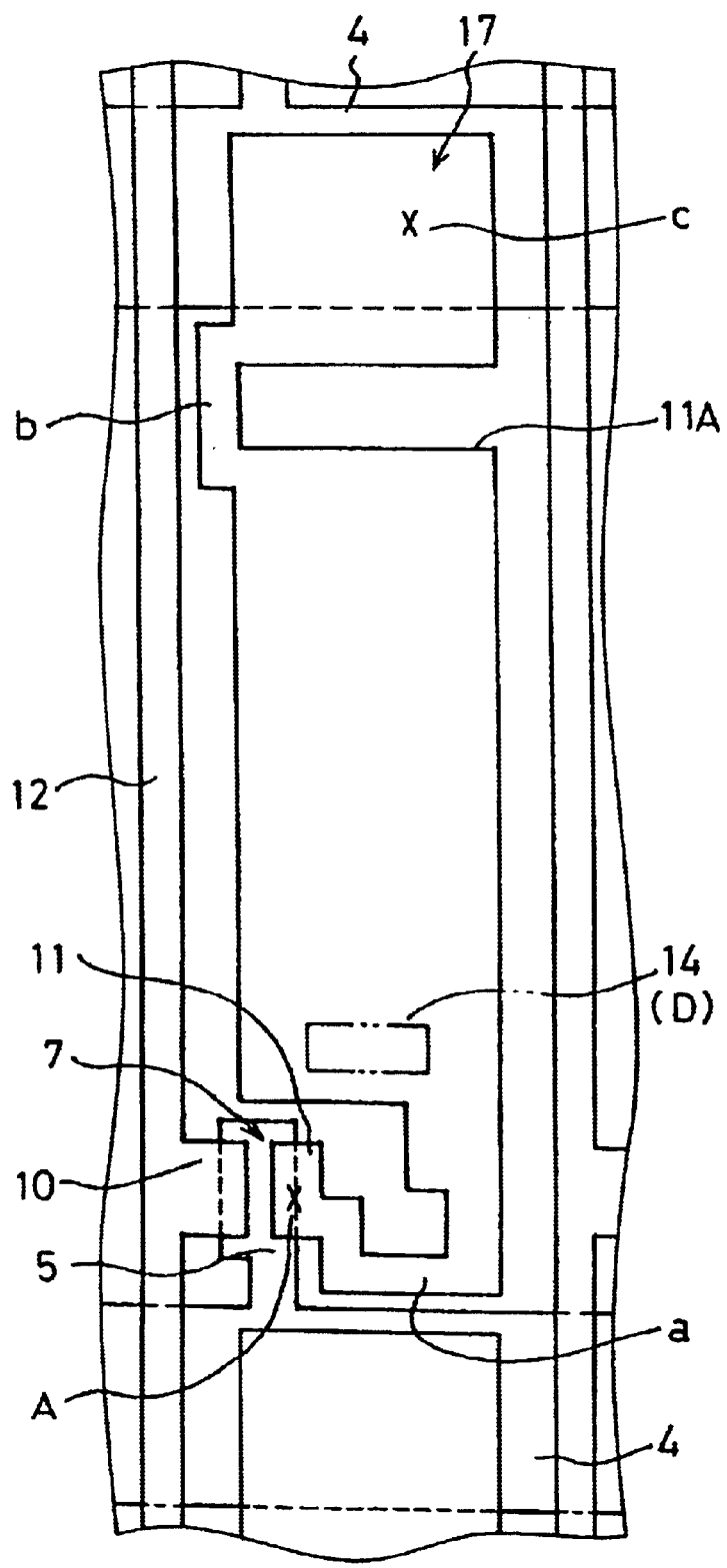
FIG. 14 is a diagram showing a plan view of a drain electrode in the one-pixel portion of the liquid crystal display apparatus in accordance with the embodiment 1 of the invention.
Figure 15:
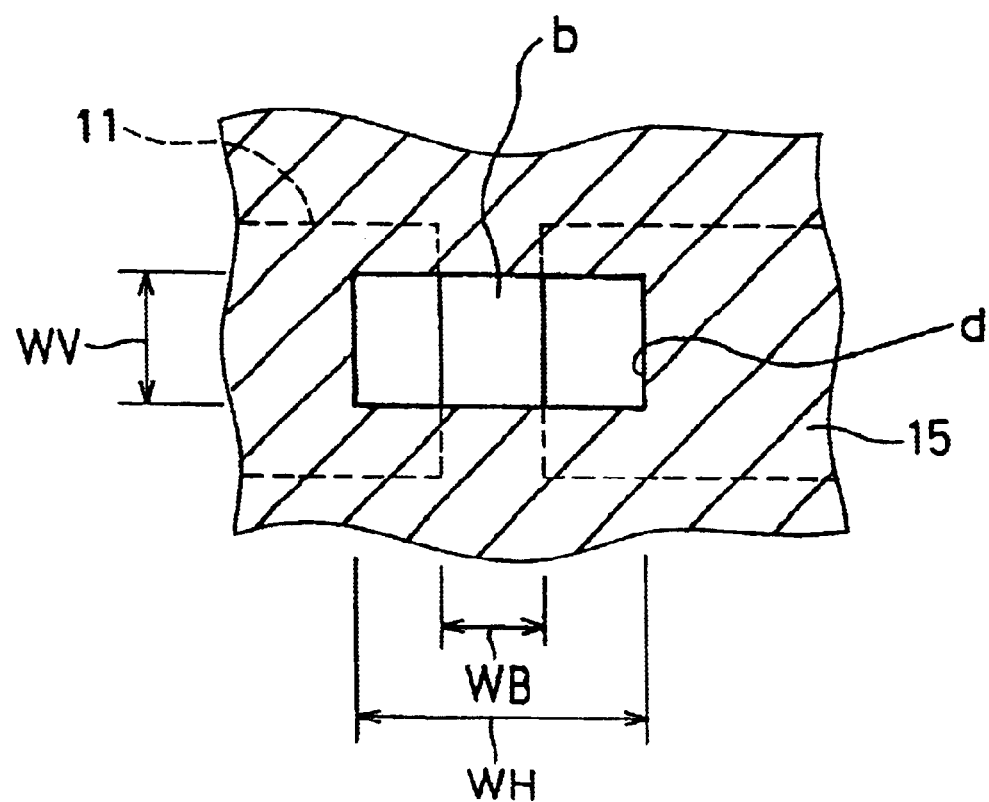
FIG. 15 is an enlarged plan view of part of an active matrix substrate explaining the size of an opening of a pixel electrode used for repair of defects.

FIG. 12 is an enlarged partial plan view of a one-pixel portion along with its surrounding part of a liquid crystal display apparatus in accordance with an embodiment 6 of the invention. FIG. 13 is an enlarged partial plan view of a one-pixel region of the liquid crystal display apparatus in accordance with the embodiment 6 of the invention. FIG. 14 is an enlarged partial plan view of the one-pixel portion of an active matrix substrate for explanation of the state of the active matrix substrate of FIG. 13 with a pixel electrode removed therefrom for clarity purposes only.

As shown in FIGS. 12–13, the liquid crystal display apparatus in the embodiment 6 is arranged including a pair of substrates 2, 3 with a liquid crystal layer 1 sandwiched therebetween. And, one of the substrates—here, lower substrate 3—has its surface on which a scan signal transmission line 4 is provided along with a gate electrode 5 as diverted from the scan signal transmission line 4 while a gate insulation film 6 is formed overlying almost the entire surface of substrate 3.

In addition, a semiconductor layer 8 is provided at a TFT 7 formation portion overlying the gate insulation film 6, on which two divided contact layers 9 are formed overlying the semiconductor layer 8. Further provided thereon are a source electrode 10 partly overlapping one contact layer 9 and a drain electrode 11 partly overlapping the remaining contact layer 9.

As shown in FIG. 14, this source electrode 10 is provided and diverted from its associative data signal transmission line 12 whereas the drain electrode 11 is arranged overlapping, via the gate insulation film 6, a scan signal transmission line 4 disposed adjacent to a certain end of a pixel electrode opposite to the other end at which the TFT 7 is connected after completion of the liquid crystal display apparatus. Moreover, an auxiliary capacitor section 17 is formed at an overlap portion of the drain electrode 11 and the scan signal transmission line 4 nearest to the opposite end—i.e. a scan signal transmission line 4 for use in sending a gate signal one before. This auxiliary capacitor section 17 is designed to have what is called the "Cs on Gate" structure. On the other hand, as the drain electrode 11 and data signal transmission line 12 are formed at the same level over the substrate at the same process step, these are formed to be spaced apart from each other for electrical short circuit elimination.

An interlayer insulating film 13 is formed to cover almost the entire surface of the substrate 3 with a contact hole 14 provided in this interlayer insulating film 13 at a specified location overlying the drain electrode 11. A pixel electrode 15 as shown in FIG. 1, made of a chosen reflective electrode material, is provided on the interlayer insulating film 13 wherein part of this pixel electrode 15 is filled into the contact hole 14 for electrical connection with the drain electrode 11. Finally, an alignment film 16 is formed over the substrate 3 including the pixel electrode 15 to thereby complete the active matrix substrate of the embodiment 6.

FIG. 13 is a diagram showing the layout of parts or components in a one-pixel region of the active matrix substrate of the liquid crystal display apparatus, and repetitive formation of requisite components with such layout being as a unit permits fabrication of the active matrix substrate. In addition, the upper-side substrate 2 in the drawing with a liquid crystal layer 1 sealed between it and the lower substrate 3 is provided with a transparent electrode made of ITO, for example, for use as an opposed or "counter" electrode 18, on which an alignment film 19 is provided thereby constituting the counter substrate. And, the liquid crystal layer 1 is sandwiched between these both substrates 2, 3 to complete the illustrative liquid crystal display apparatus.

An explanation will be given of the drain electrode 11 of the liquid crystal display apparatus in embodiment 6 with reference to the plan view diagram of FIG. 14. This drain electrode 11 has a recess portion 11A formed therein as shown in FIG. 14, thereby constituting a single conductive path. The contact hole 14 is placed at a specified position along the drain electrode 11, causing the drain electrode 11 to be electrically connected to the pixel electrode 15 via this contact hole 14. The part for electrical connection by this contact hole 14 is an electrical connection section D. In embodiment 6 the drain electrode 11 is arranged to be partly narrowed in width at selected positions, thus defining to-be-corrected portions b, a, which positions are, respectively, in the upstream of the conductive path (drain electrode 11) on the side of TFT 7 of this electrical connection section D and in the downstream of the conductive path (drain electrode 11) of electrical connection section D. Note that the requisite number of such to-be-corrected portions a, b is determinable so that one or more to-be-corrected portions may be provided at each of the conductive-path upstream side and downstream side.

The pixel electrode 15 made of a chosen reflective electrode material is formed to have openings c, d in selected regions overlying the to-be-corrected portions a, b of the drain electrode 11, which openings are substantially the same in area as the to-be-corrected portions a, b. Although the apparatus design permits the opening c or d to be substantially the same in area as the to-be-corrected portion a or b of the drain electrode 11, actual implementation makes it necessary for them to be formed to have a larger area than the to-be-corrected portions a, b for preparation of various margins in the manufacture thereof.

The various margins may include an overlap margin of TFT patterns, laser-shot repairing alignment margin, to-be-corrected portion's scattering area margin, laser shot power margin for establishment of enhanced correct abilities with increased reliability, and others. Taking account of these margin parameters, it will be desirable that the width WH of the opening d along the width of the to-be-corrected portion b of the drain electrode 11 is broader by about 1 to 30 μm than the line width WB of the to-be-corrected portion b. Obviously, in the case where all the margins above are negligible, it will be permissible without suffering from any specific problems that the width of opening d is set identical to the line width of the to-be-corrected portion b of the drain electrode 11 Additionally, in view of the fact that the part on the upstream side of the drain electrode 11 and part in the downstream are electrically conducted together via the to-be-corrected portion b, the line width of the to-becorrected portion b of the drain electrode 11 may be a certain line width that will never be mechanically cut away during processes of a liquid crystal panel. Note that in the subject embodiment 6 the opening d was formed so that its size is greater by about 10 μm than the line width of the to-be-corrected portion b of the drain electrode 11.

In regard to a width WV in a direction at right angles to the width direction of the to-be-corrected portion b of the non-pixel electrode formation section (opening) d with respect to the to-be-corrected portion b of the drain electrode 11, the width is determinable depending on both a laser irradiation area and irradiation power. By taking into consideration the laser position-alignment accuracy and scattering of the drain electrode 11 or the like, the width may be set ranging from 5 to 50 μm, or more or less. Obviously, in this case also, if all the margins are negligible then it is permissible that the width WV on the vertical side of the opening d be the same as the laser irradiation width Additionally, with regard to the shape of the opening d also, such may be a square or rectangular shape or else. From the foregoing discussions, the embodiment 6 was designed letting the opening size WH×WV be of rectangular shape of 40 μm×30 μm.

Figure 16:
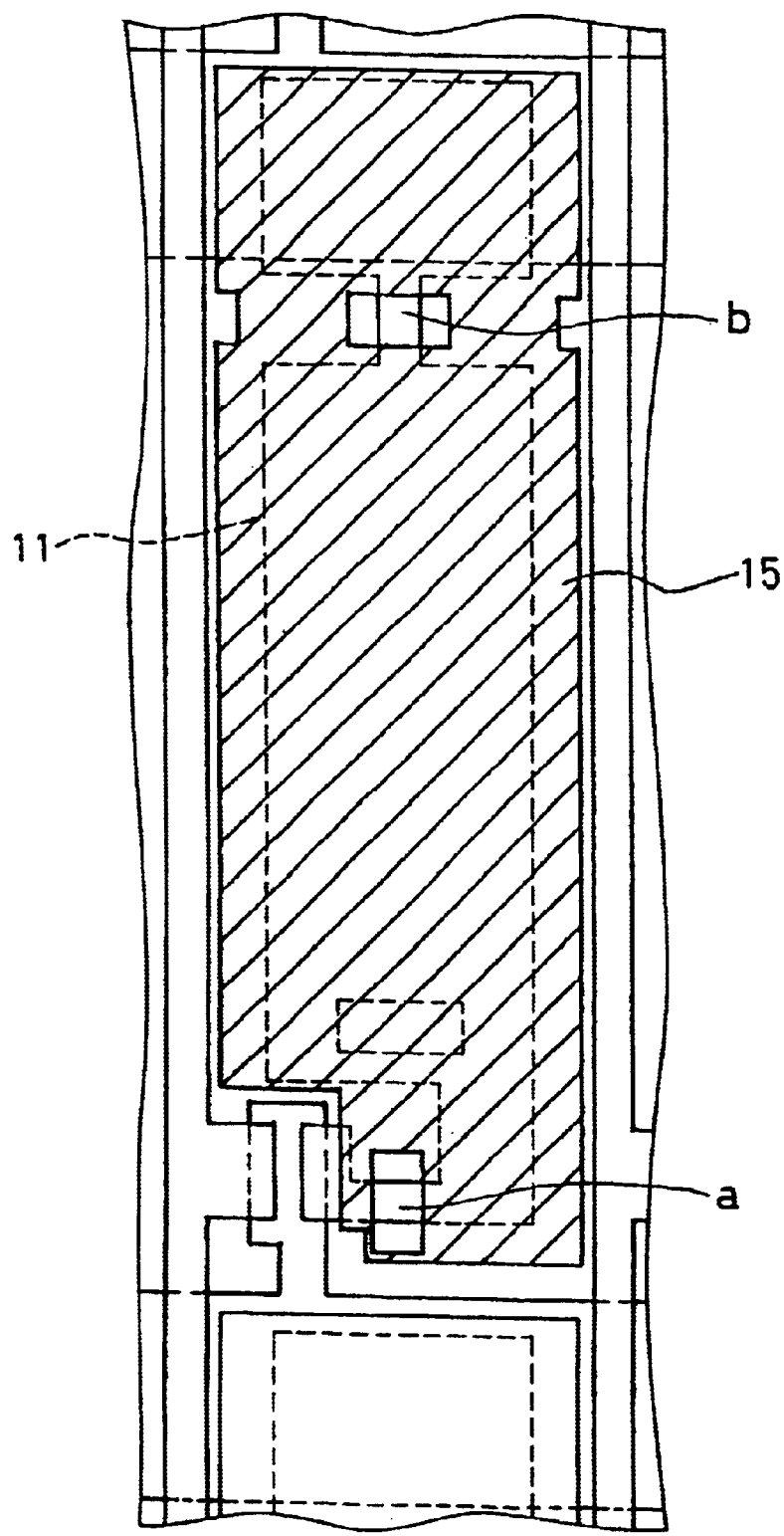
FIG. 16 is a plan view of a one-pixel region of a liquid crystal display apparatus of one comparative example in the invention.
Figure 17:
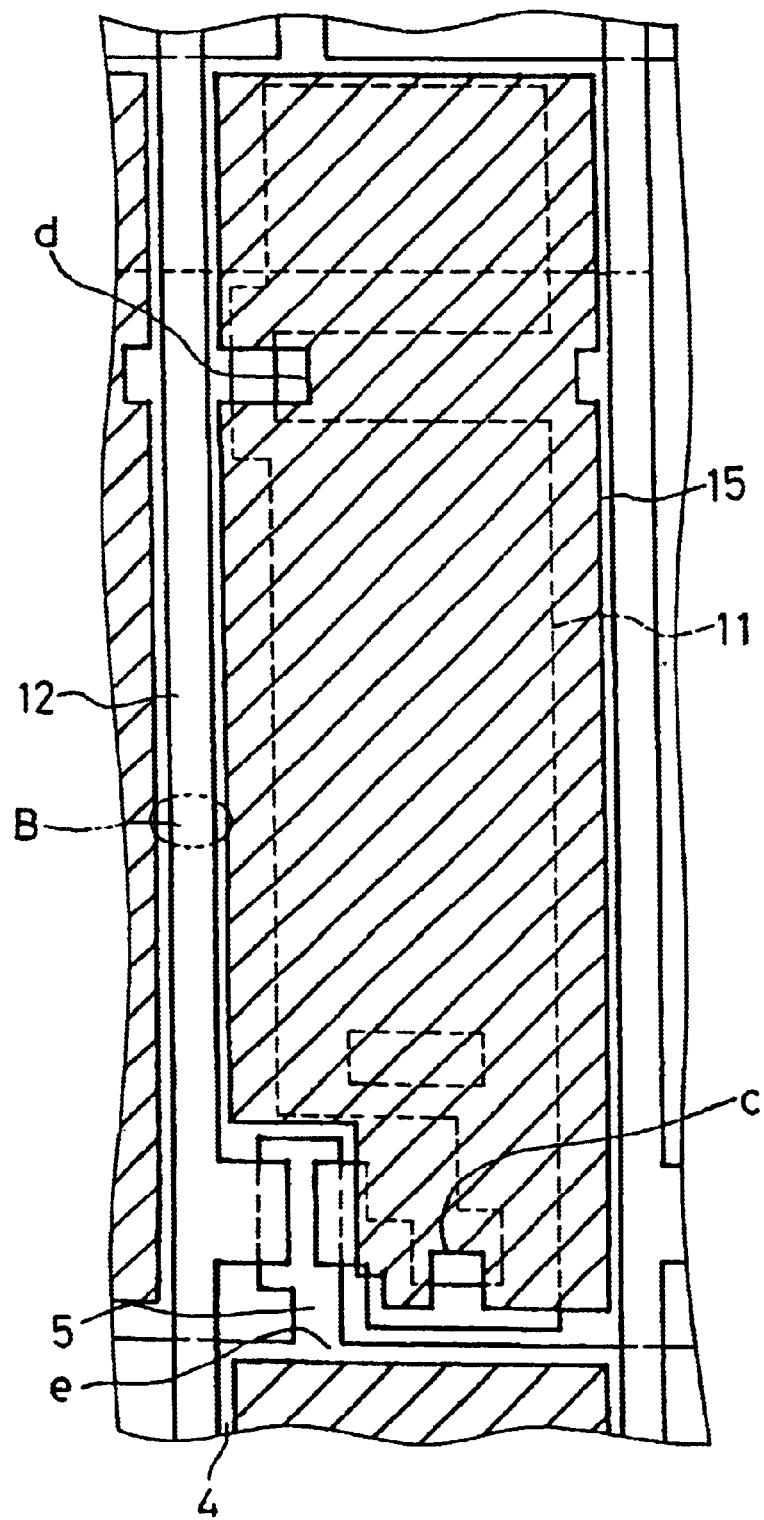
FIG. 17 is an enlarged partial plan view of a liquid crystal display apparatus in case neighboring pixel electrodes are electrically short-circuited together by contaminants in a region for subdivision of such neighboring pixel electrodes in the invention.

An explanation will be given of the to-be-corrected portions a, b of the drain electrode 11 of the liquid crystal display apparatus in embodiment 6 above. FIG. 16 depicts a plan view of a one-pixel region of an active matrix substrate of a liquid crystal display apparatus for use as a comparative example of the invention. This comparison example is such that as shown in FIG. 16, the to-be-corrected portion b of the drain electrode 11 is placed at or near the center of a pixel electrode 15. As in this example, the presence of the drain electrode 11's to-be-corrected portion near or around the center of the pixel electrode 15 can result in an opening that is greater than the drain electrode 11's to-be-corrected portion being 100% deleted from the pixel electrode 15 undesirably, which in turn leads to noticeable reduction in the resultant aperture ratio of the liquid crystal display apparatus.

To avoid this, the embodiment 6 is arranged as follows: When forming the to-be-corrected portions a, b of the drain electrode 11, the pixel electrode's openings c, d are laid out so that these are in contact with the outer periphery of the pixel electrode 15 as shown in FIGS. 12–13. This results in part of the openings c, d being greater in dimension than the drain electrode 11's to-be-corrected portions a, b being formed to overlap a region in which no pixel electrodes are formed for subdivision of neighboring pixel electrodes 15 (referred to as the "pixel division region" hereinafter), the overlapping portion enabling likewise suppression of reduction of the aperture ratio. Additionally, with the embodiment 6, the pixel electrode opening was designed overlapping the pixel division region by about 50% to thereby avoid any unwanted aperture ratio reduction.

As apparent from the foregoing, as the embodiment 6 is arranged so that the drain electrode 11 of the liquid crystal display apparatus has to-be-corrected portions a, b formed therein, it becomes possible to cure any defects as found during product test procedures in the manufacture thereof, in a way which follows. Note that since the liquid crystal display apparatus in the embodiment 6 is of normally black mode, defect repair depending on the location thereof will be done as indicated in the normally black column in Table 2 as will be presented later.

<<Table 2 Is Identically the Same as the Table 1>>

Firstly, as shown in FIG. 14, in case the gate electrode 5 and drain electrode 11 are shorted together at the point A of the TFT 7 resulting in malfunction of the TFT 7 the to-be-corrected portion a is cut in the upstream of the drain electrode 11. Thereby, the pixel electrode 15 is separated and disconnected from the drain electrode 11 and is in the electrically floating state and thus acts as a turn-off or "undriven" pixel, thus enabling reduction or minimization of visual recognition of a defect on the display screen.

Similarly, where the drain electrode 11 and scan signal transmission line 4 are shorted together at a point C of the auxiliary capacitor section 17, the downstream to-be-corrected portion b of the drain electrode 11 is cut. Alternatively, where a pixel electrode 15 and its neighboring pixel electrode 15 are shorted together due to presence of contaminants at the point B in a region for dividing neighboring pixel electrodes 15, the upstream-side to-be-corrected portions a of both drain electrodes 11 of such neighboring pixel electrodes 15 are cut. Still alternatively, when both the point A of TFT 7 and the point C of auxiliary capacitance section 17 are shorted, or when all the points A–C are shorted, both the upstream and downstream to-be-corrected portions a, b of drain electrode 11 are cut.

In this way, embodiment 6 is capable of curing or correcting any defects found during inspection, by cutting through laser irradiation the upstream to-be-corrected portion a or downstream to-be-corrected portion b of the drain electrode 11 so that any defects that can affect the on-screen display abilities such as line defects and/or bright dots or the like will no longer be visualized on the screen thus improving the manufacturing efficiency of the liquid crystal display apparatus.

Figure 18:
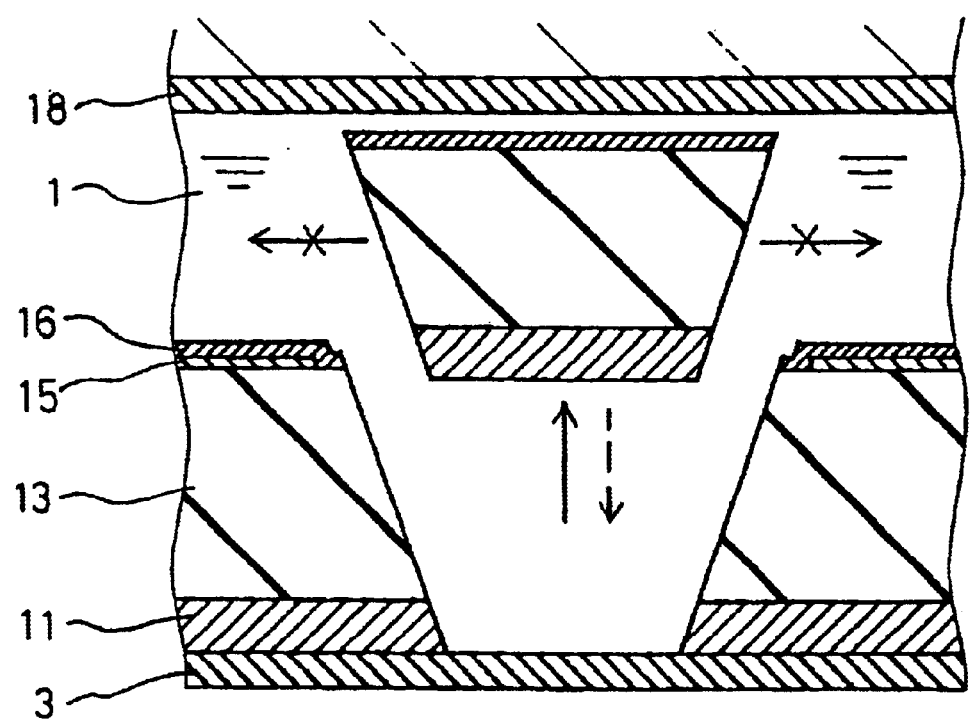
FIG. 18 is an enlarged cross-sectional view in case an interlayer insulating film is similar in thickness to a liquid crystal layer in the invention.

FIG. 18 illustrates in cross-section a defect repairing portion of the liquid crystal display apparatus of embodiment 6. As shown in FIG. 18, in case the thickness of the interlayer insulating film 13 approximates in value the thickness of liquid crystal layer 1, any fragments of such interlayer insulating film 13 with the drain electrode 11 of the repairing section attached thereto will hardly behave to fly out into the liquid crystal layer 1 and continue residing at the cutout portion, i.e. a repairing section, and then return to its original position due to application of vibrations and pressures thereto, which possibly results in occurrence of re-leakage of the cutout portion.

Figure 19:
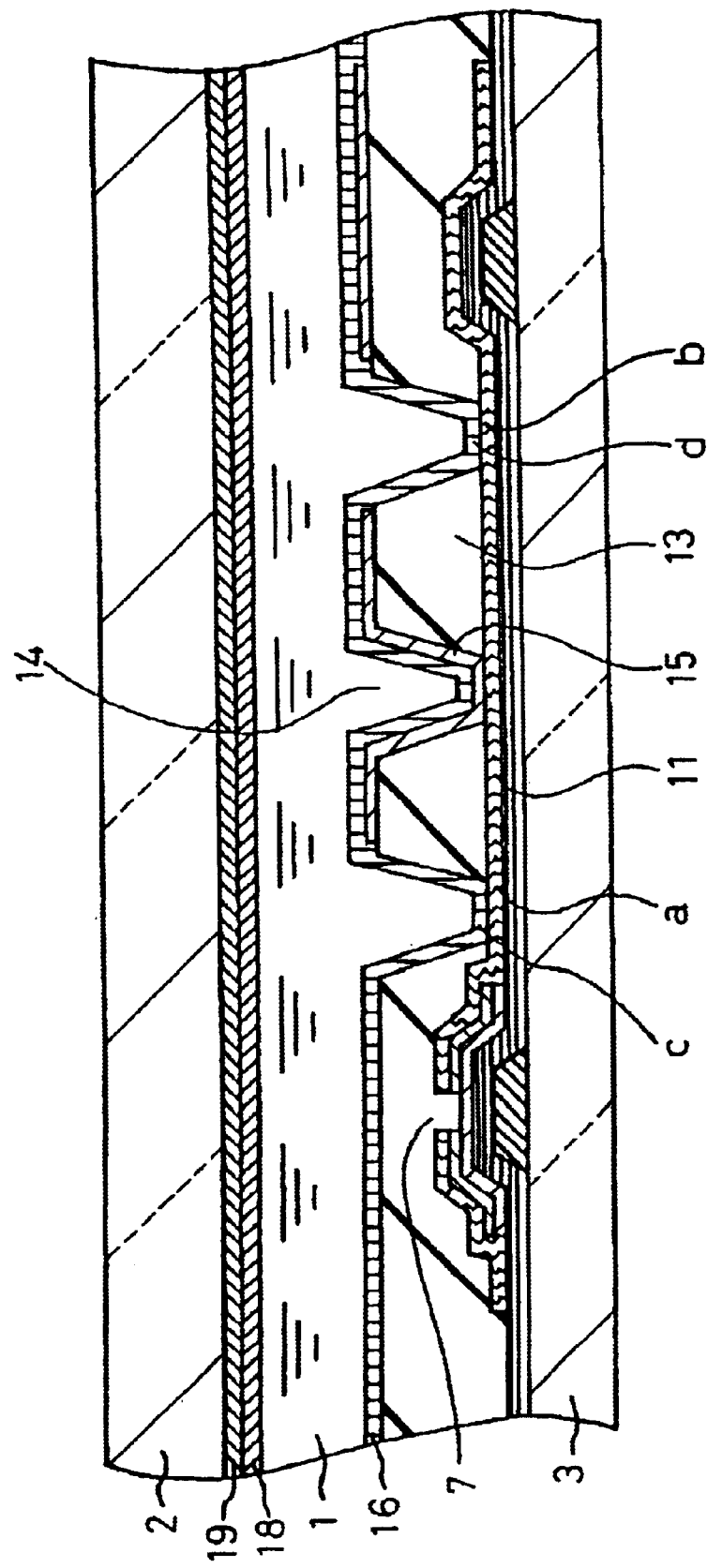
FIG. 19 is a cross-sectional diagram showing the liquid crystal display apparatus in the embodiment 6 of the invention.

In this way, for enabling effectuation of the intended repair even in the case of a liquid crystal display apparatus that is arranged so that the thickness of the interlayer insulating film 13 approximates the thickness of liquid crystal layer 1, the interlayer insulating film 13 is desirably prevented from being formed at specified portions lying between the to-be-corrected portions a, b of the drain electrode 11 and the openings c, d of pixel electrode 15 as shown in FIG. 19. In the liquid crystal display apparatus with the arrangement shown in FIG. 19, the alignment film 16 and liquid crystal layer 1 are stacked or laminated over the regions of the to-be-corrected portions a, b of the drain electrode 11.

With the liquid crystal display apparatus thus arranged, the absence of any interlayer insulating film 13 overlying the to-be-corrected portions a, b of the drain electrode 11 makes it possible to achieve the intended cutting processes by use of low-power laser light. Note that repairing methodology may be the same as that stated supra.

It will possibly happen that thin portions of the interlayer insulating film 13 can reside during manufacturing processes even where apparatus design does not intend to form such interlayer insulating film 13 overlying the to-be-corrected portions a, b of the drain electrode 11. However, even if this is the case, similar advantages of the liquid crystal display apparatus stated above are achievable because the interlayer insulating film 13 is thin sufficiently. Additionally, although embodiment 6 has been explained under an assumption that the liquid crystal display apparatus is a reflective liquid crystal display apparatus having pixel electrodes made of reflective electrode materials, the instant invention should not be limited only to such liquid crystal display apparatus of the reflection type.

In embodiment 7 an explanation will be given, with reference to FIG. 20, of a to-be-corrected portion that is formed at part of a gate electrode 5 as diverted from the scan signal transmission line 4. In embodiment 7, the to-be-corrected portion is a neck portion of the gate electrode, having a width narrower than that of the other portions thereof.

Typically in a liquid crystal display apparatus of the transmission type including a TFT 7 with its gate electrode 5 diverted from its associated scan signal transmission line 4, any transparent pixel electrode 15 will not be formed in view of the fact that those regions in which a gate electrode 5's diverted or branch portion and drain electrode 11 plus source electrode are laid out (which employ no transparent electrode materials) become optically opaque regions which permit transmission of no rays of light. On the contrary, in the reflective liquid crystal display apparatus, it is possible to form the reflective pixel electrode 15 extending to overlie the upper part of the TFT 7 due to the fact that such apparatus is inherently designed to perform displaying operations by utilizing externally attendant light from the entire surface of its panel.

Figure 20:
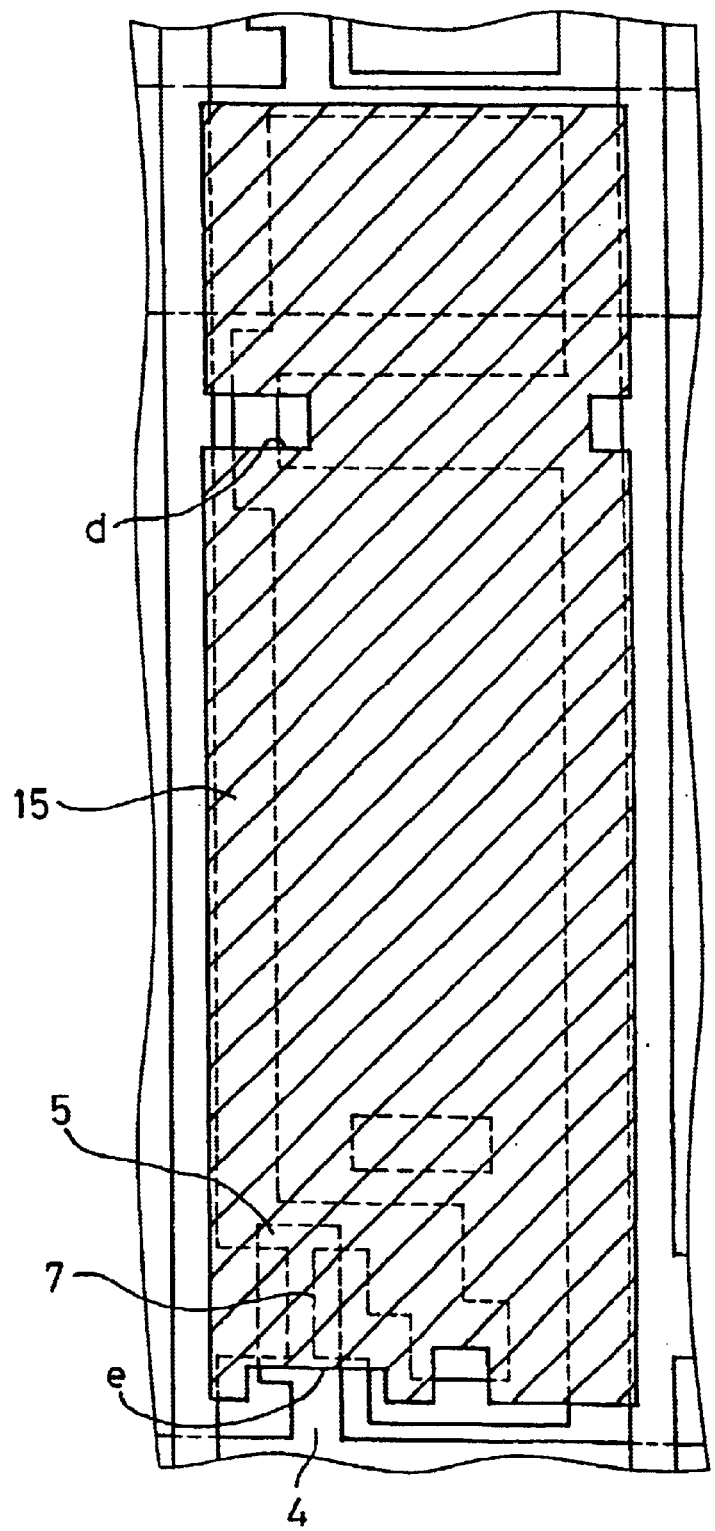
FIG. 20 is a plan view diagram showing one-pixel part of the liquid crystal display apparatus in accordance with the embodiment 7 of the invention.

Due to this, in case the to-be-corrected portion of the gate electrode 5 shown in FIG. 20 is cut for repair of defects in the reflective liquid crystal display apparatus, it is required that an opening be formed in the pixel electrode 15 as in the embodiment 6 discussed previously. And, where the gate electrode 5's to-be-corrected portion is formed, the opening is formed so that it is disposed over such to-be-corrected portion of the gate electrode 5 and is in contact with the outer periphery of the pixel electrode 15. This allows part of the opening that is greater in size than the gate electrode 5's to-be-corrected portion to be formed overlapping a pixel division region for separation of neighboring pixel electrodes 15, which in turn makes it possible to suppress reduction in aperture ratio in a way substantially proportional to the significance of such overlap portion. Additionally, with the embodiment 7, the pixel electrode opening was designed overlapping the pixel division region by about 60% to thereby avoid the aperture ratio reduction.

It has been explained that in the foregoing embodiments 1–7 a specific opening is formed in selected regions of a pixel electrode 15 overlying part of the to-be-corrected portions a, b of the drain electrode 11, the gate electrode's to-be-corrected portions and the common line which are provided as repair portions to have nearly the same area as these repair portions to thereby enable repair of defects as found during test/inspection procedures by effectuation of cutting processes through irradiation of laser light at such repair portions, which in turn ensures that any defects that can affect the display abilities such as line defects and/or bright dots or the like will no longer be visualized on the screen thus improving the manufacturing efficiency of liquid crystal display apparatus.

Figure 21A:
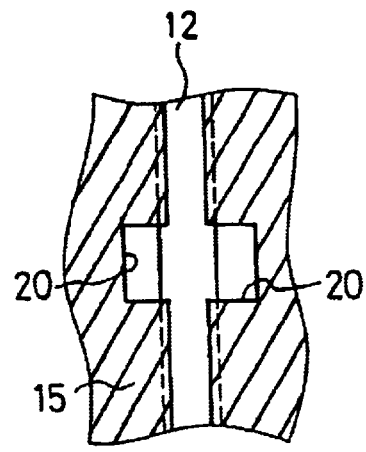
FIGS. 21A and 21B are diagrams each showing part of an active matrix substrate of the liquid crystal display apparatus shown in FIG. 10 which is an arrangement relating to cut-and-separate processes of a scan signal transmission line.

In an embodiment 8, an explanation will be given, with reference to FIG. 21, of the case where the data signal transmission line 12 is cut for repair of defects in a liquid crystal display apparatus. The configuration of the liquid crystal display apparatus of the embodiment 8 excluding the arrangement of its pixel electrode—this will be explained with reference to FIGS. 21A–21B below—is the same as that of one of the embodiments 1–7.

Also in the case of cutting the data signal transmission line 12 for repair of defects, it is required, as in the embodiment 6, that a non-pixel electrode formation region be formed to have its size substantially the same as the line width of the data signal transmission line 12 for use as a repair portion. Accordingly, as shown in FIG. 21A, openings 20 of recessed shape are formed at outer peripheral parts of neighboring pixel electrodes 15 with a data signal transmission line 12 extending between them in a manner that they oppose each other. This makes it possible, as in the embodiment 6, to cure or correct those defects found during inspection by cutting through laser irradiation the data signal transmission line 12 so that any defects which can affect the on-screen display abilities such as line defects and/or bright dots or the like will no longer be visualized on the screen thus improving the manufacturing efficiency of the liquid crystal display apparatus.

Figure 21B:
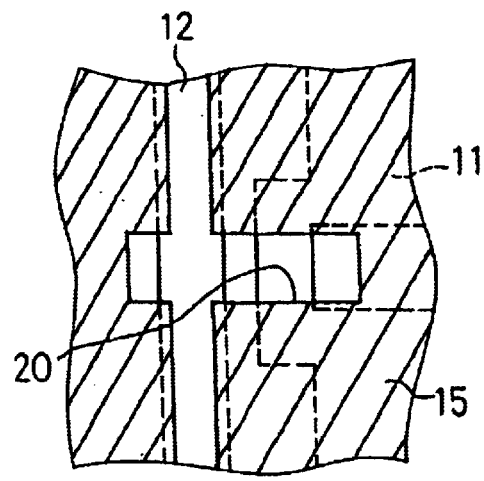

Additionally, the embodiment 9 is modifiable as shown in FIG. 21B, wherein one of the openings 20 which overlies the drain electrode 11's defect correction portion is formed at the outer periphery of the pixel electrode 15 for suppression of reduction in the aperture ratio, and further the opening 20 is formed at the outer periphery of the pixel electrode 15 for allowing it to serve also as the opening 20 overlying the data signal transmission line 12's defect repair portion stated above. With such an arrangement, the embodiment 8 was capable of suppressing aperture ratio reduction by about 30% as compared to the case where openings are provided over the drain electrode and over the data signal transmission line in a way independent of each other. The pixel electrode opening overlying the data signal transmission line should not be limited to such arrangement wherein the pixel electrode opening overlying the drain electrode also serves as the former, and may alternatively be modified so that the same serves as either a pixel electrode opening overlying a gate electrode or a pixel electrode opening overlying a common branch.

A patterning technique of a reflective electrode in the liquid crystal display apparatus will now be explained with reference to FIGS. 22–25.

Figure 22:
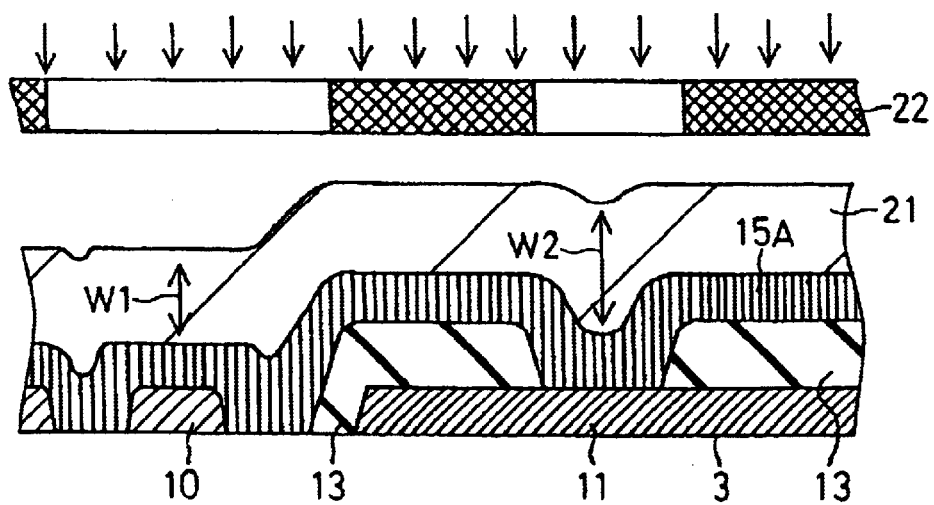
FIG. 22 is a process-step sectional diagram of FIG. 16 which is a comparison example of the invention.

FIG. 22 depicts an enlarged partial sectional view of one comparative liquid crystal display apparatus that has been explained in conjunction with the above embodiment 6, which shows one process step in the manufacture of the active matrix substrate thereof. As shown in FIG. 22, in this comparison example, after having fabricated on the entire surface of a substrate 3 a thin-film 25 made of a chosen reflective electrode material, a photo resist 21 (OFPR800, for example) is deposited by spin-coat techniques to a predetermined thickness of approximately 1.0 $\mu$m for patterning of the thin-film 15; then, a predetermined photo mask 22 is used to perform exposure processing.

Here, as shown in FIG. 22, a certain region having the resist film thickness of W1 in the drawing is provided as a pixel division region which is a region for use in dividing neighboring pixel electrodes 15 whereas a region having the resist film thickness of W2 in the drawing is as an opening of the pixel electrode for repair of defects, the both of these regions being the regions for removal of the thin-film 15.

As in this comparative example, unintentional presence of an independent opening for repair of defects at the center of a pixel electrode 15 would result in a resist being coated on or over the substrate 3 to planarize a region without accompanying the interlayer insulating film 13, which in turn causes the film thickness W2 of the resist at an opening for repair of defects to become greater than the resist film thickness W1 in a pixel division region.

In other words, letting exposure criteria be adapted for the resist film thickness W1 in the pixel division region can result in presence of residual resist components at the opening for repair of defects during exposure processes due to the fact that the film thickness W2 is greater than film thickness W1, leading to creation of etching failures of the pixel electrode 15.

On the contrary, letting the exposure criteria be suited for the film thickness W2 of the opening for repair of defects might result in over-exposure of a subdivision area of the pixel electrode 15 due to the fact that the film thickness W1 is less than the film thickness W2, which in turn makes it impossible to obtain any desired pixel electrode width thus reducing the resultant aperture ratio.

As in this comparison example, unwanted presence of the pixel electrode's opening at the center of the pixel electrode 15 independently of others would make difficult determination of the exposure criteria or conditions of the pixel electrode 15, causing the resultant structure to be extremely less in applicability to patterning of the pixel electrode 15.

Figure 23:
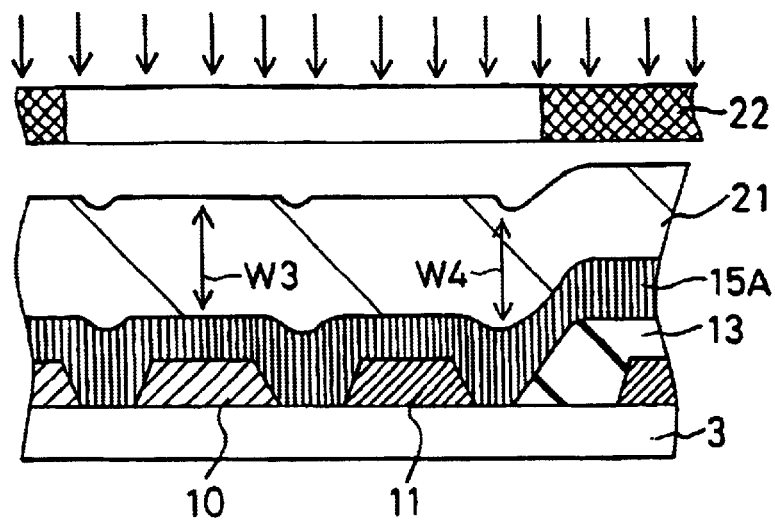
FIG. 23 is a process-step sectional diagram of FIG. 13 which is the embodiment 6 of the invention.

FIG. 23 illustrates, in cross-section, one major step in the manufacture of the active matrix substrate that has been explained in the above embodiment 6. As shown in FIG. 23, with this arrangement also, after having formed on the entire surface of a substrate 3 a thin-film 15A made of a reflective electrode material, a photo resist 21 (OFPR800, as an example) is deposited by spin-coat methods to a thickness of about 1.0 $\mu$m for patterning of the thin-film 15A; then, a predetermined photo mask 22 is used to perform exposure processing.

Here, as shown in FIG. 23, a certain region having the resist film thickness of W3 in the drawing is as a pixel division region which is a region for use in dividing neighboring pixel electrodes 15 whereas a region having the resist film thickness of W4 in the drawing is as an opening for use during repair of defects, the both of these regions being the regions for removal of the thin-film 15.

Comparing the arrangement of the liquid crystal display apparatus of the embodiment 6 shown in FIG. 23 with that of the liquid crystal display apparatus of the comparative example shown in FIG. 22, one significant difference between the two is that the opening for repair of defects and the pixel division region are arranged continuously, Consequently, with the arrangement of the embodiment 6 shown in FIG. 23, a difference between the resist film thickness W4 of the opening for repair of defects and the resist film thickness W3 in the pixel division region gets smaller when compared to the arrangement of the comparison example shown in FIG. 22, thereby enabling easy determination of the best possible criteria for resist exposure processing in the pixel division region and the opening for repair of defects, which results in achievement of a structure that is noticeably increased in applicability to patterning of the pixel electrode 15.

Figure 24:
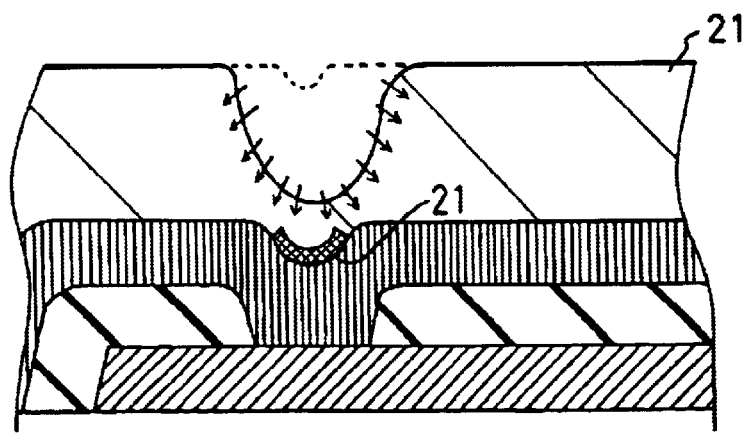
FIG. 24 is a process-step sectional diagram of FIG. 16 which is a comparison example of the invention.
Figure 25:
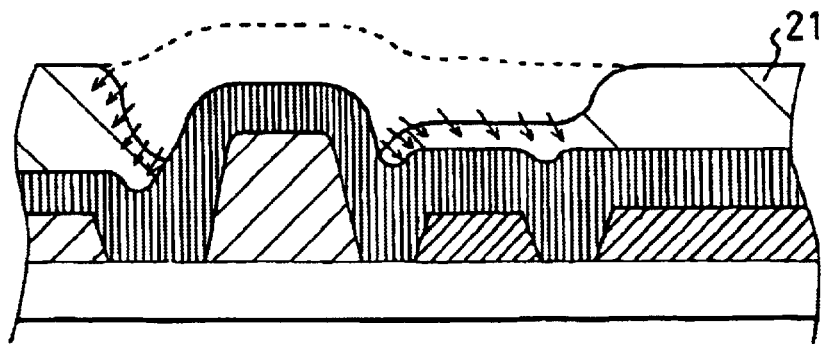
FIG. 25 is a process-step sectional diagram of FIG. 13 which is the embodiment 6 of the invention.

Further, as shown in FIGS. 24–25, even where the situations of undercoat film thicknesses are different between the pixel division region and the opening for repair of defects, the intended patterning processing may be successfully performed by letting the exposure criteria be well suited for a specific one with a thinner resist film, because of the fact that the both are arranged continuously.

Although this is generally designed so that isotropical development is done using liquid developer during resist development processes, where a non-pixel formation section for repair of defects is independently present within the pixel electrode 15 as shown in FIG. 22, development effects principally from its upward direction are merely expected as shown in FIG. 24 resulting in presence of residual resist film components.

FIG. 25 depicts in cross-section a process step during resist development in the embodiment 6 mentioned above. As previously stated, a chosen liquid developer is typically used during such resist development to perform the intended development processing so that the resist will be developed isotropically in most cases; when the pixel division region and the opening for repair of defects are arranged continuously as shown in FIG. 23, a development effect from lateral directions is also expectable in addition to the development effect from the upward direction thereof as shown in FIG. 25, which in turn makes it possible to accomplish successful patterning results even for those regions with the resist film thickness increased.

It should be noted that the development processing schemes as explained in conjunction with FIGS. 22–25 may offer similar advantages not only for the resist development but also for other similar processes including but not limited to wet etching processes of reflective electrode materials.

In the embodiments 1 to 8 mentioned above, the drain electrode is made relatively large so as to be near to the size and form of the pixel electrode. This is because, in the process of forming a resin film as the interlayer insulating layer in the region where the pixel electrode is disposed, properties (e.g., contact ability, thermal conductivity and irradiation amount of light of the drain electrode and pixel electrode), which are affected from the size and form thereof, are intended to be made uniform in the region. In order to compensate drawbacks of such large drain electrode by laser light, it is preferable to made the to-be-corrected portion of the drain electrode narrower than that of the rest portion thereof. Thereby it is made easier to cut the to-be-corrected portion of the drain electrode. The same goes for the to-be-corrected portion of the gate electrode. By forming the to-be-corrected portion of the gate electrode as a to-be-corrected portion, it is made easier to cut the to-be-corrected portion. The form of the drain electrode and gate electrode is not limited to the form mentioned above, and any form may be employed therefor.

Figure 26:
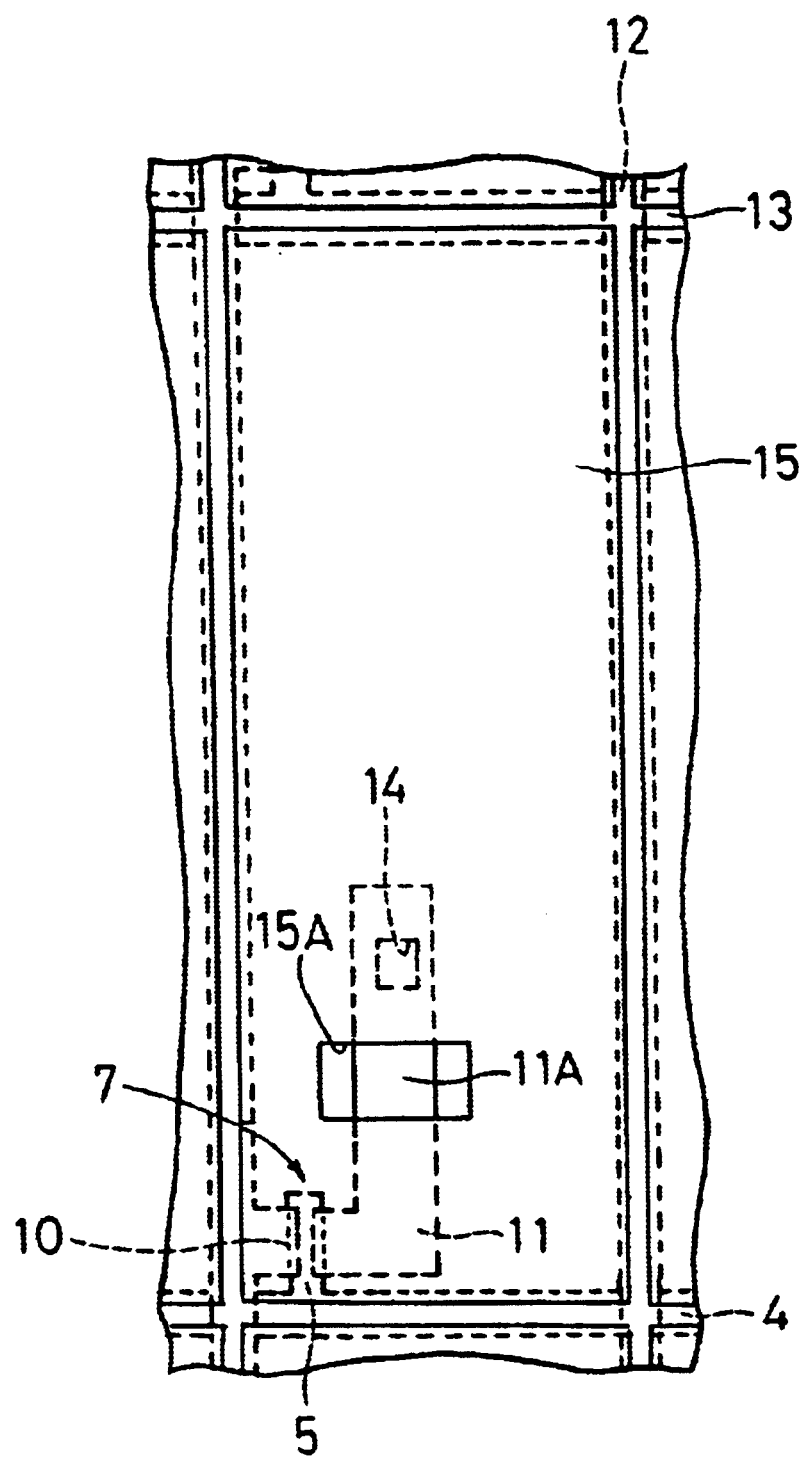
FIG. 26 is a plan view of a one-pixel region of a liquid crystal display apparatus comprising a drain electrode having no to-be-corrected portion.

For example, when the liquid crystal display apparatus of the invention comprises no auxiliary capacitor section, as shown in FIG. 26, the drain electrode 11 may be formed considerably smaller than the pixel electrode 15, provided that the drain electrode 11 can be connected with the pixel electrode 15 via the contact hole 14. When the liquid crystal display apparatus of the invention comprises an auxiliary capacitor section, as shown in FIG. 27, the drain electrode 11 maybe formed considerably smaller than the pixel electrode 15, provided that the drain electrode 11 can be connected to the pixel electrode 15 via the contact hole 14 and has enough size and form to serve as one electrode of the auxiliary capacitor section.

Figure 27:
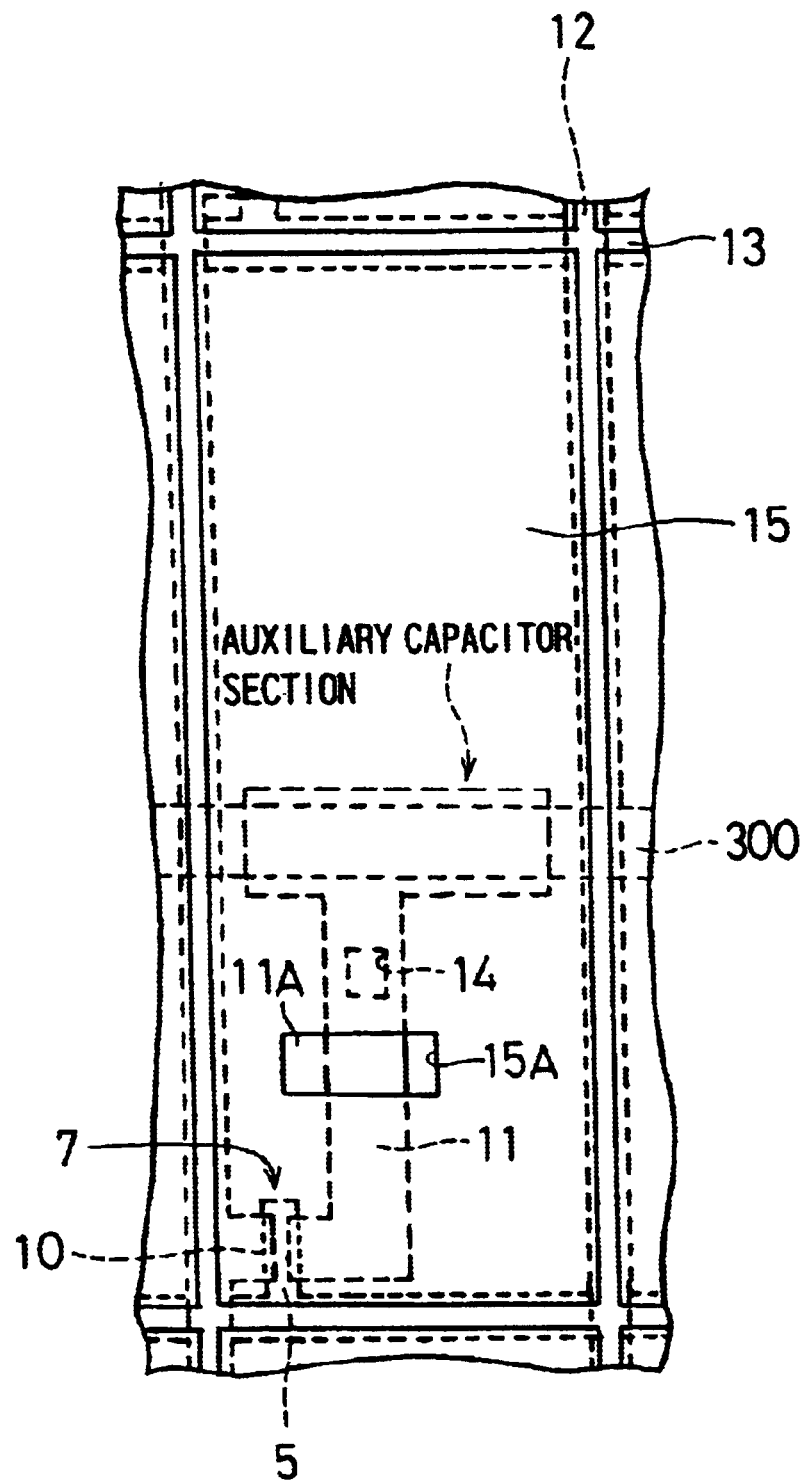
FIG. 27 is a plan view of a one-pixel region of a liquid crystal display apparatus comprising a drain electrode having no to-be-corrected portion and an auxiliary capacitor section.
Figure 28A:
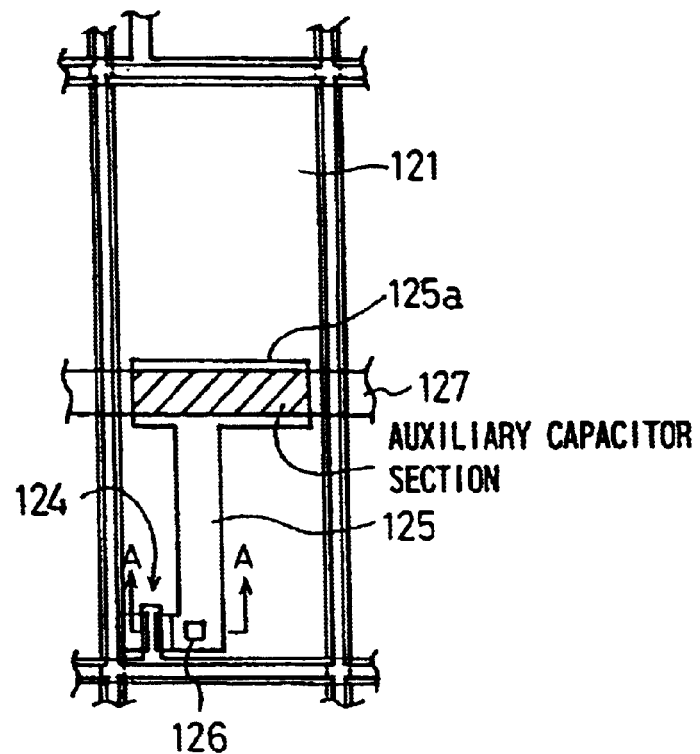
Figure 28B:
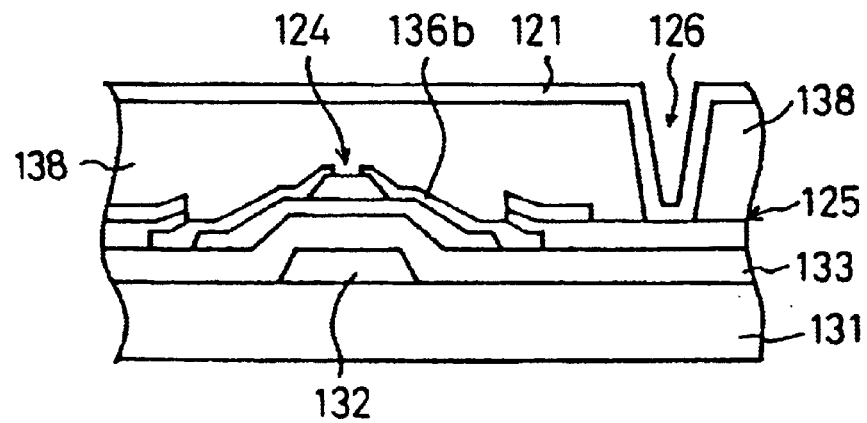
FIG. 28B is a sectional view thereof.
Figure 29A:
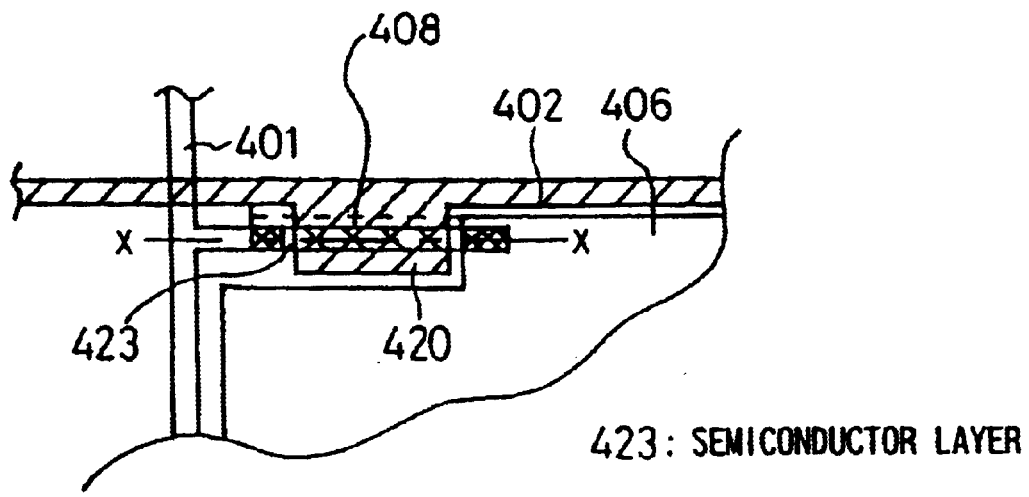
Figure 29B:
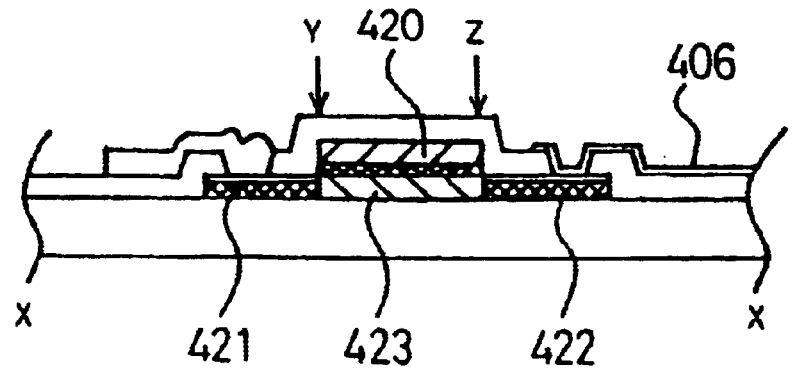
FIG. 29B is its sectional view.
Figure 30:
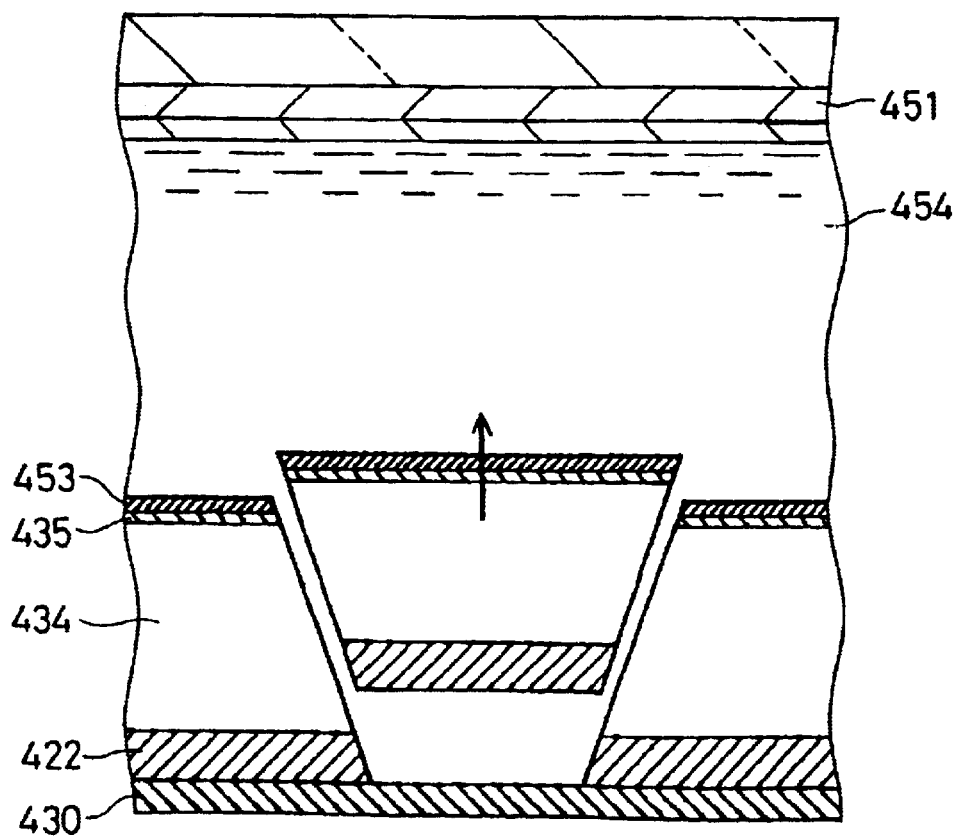
FIG. 30 is a sectional diagram showing laser irradiation correction state in a traditional liquid crystal display apparatus.
Figure 31:
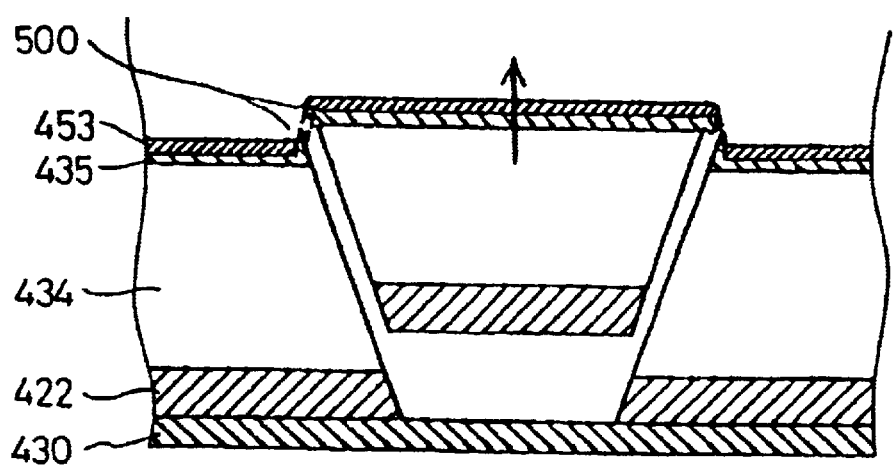
FIG. 31 is a sectional diagram showing laser irradiation correction state in a prior art liquid crystal display apparatus.

In FIGS. 26 and 27, the portion between the end of the drain electrode 11 on the TFT 7 side and the contact hole is the to-be-corrected portion 11A, and in a region of the pixel electrode 15 on the to-be-corrected portion 11A of the drain electrode 11 is formed the opening 15A. In this case the width of the to-be-corrected portion 11A of the drain electrode 11 may be the same as that of the rest portion thereof. Namely, the drain electrode may have no to-be-corrected portion in the to-be-corrected portion. Additionally, it is preferable that an opening is formed in a region on the to-be-corrected portion 11A of the drain electrode 11 of the interlayer insulating layer 13. The same as the drain electrode, the gate electrode may have also no to-be-corrected portion in the to-be-corrected portion. As mentioned above, when the liquid crystal display apparatus comprises either the drain electrode 11 and gate electrode 5 each having no to-be-corrected portion or the drain electrode 11 considerably different from the pixel electrode 15 in form and size, it is preferable that an opening is formed in the region of the pixel electrode on the to-be-connected portion of the electrode of the liquid crystal display apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus comprising:
    a switching device connected to a gate line and a signal line;
    a pixel electrode connected to the switching device;
    an opening formed in the pixel electrode to expose a potential correction site provided therebeneath;
    an interlayer insulation film generally formed beneath the pixel electrode but not beneath the opening which exposes the potential correction site.

2. The liquid crystal display apparatus of claim 1, wherein the potential correction site is at one of a drain electrode of the switching device; a gate electrode of the switching device; and a branch of an auxiliary capacitance line.

3. The liquid crystal display apparatus of claim 1, wherein the opening is formed at a periphery of the pixel electrode.

4. The liquid crystal display apparatus of claim 3, wherein the opening is formed at a periphery of the pixel electrode which is proximate the signal line.

5. The liquid crystal display apparatus of claim 2, wherein the potential correction site is a narrowed width portion of the branch of the auxiliary capacitance line.

6. The liquid crystal display apparatus of claim 2, wherein the drain electrode comprises a potential correction site which has a narrowed width.

7. The liquid crystal display apparatus of claim 2, wherein the gate electrode comprises a potential correction site which has a narrowed width.

8. A liquid crystal display apparatus comprising:
    a pair of substrates disposed opposing each other;
    a liquid crystal layer sandwiched therebetween;
    a data signal transmission line for supplying data signals, laid out on one of the substrates;
    a scan signal transmission line for supplying timing signals, laid out on the one of the substrates;
    an auxiliary capacitance line for forming an auxiliary capacitance,
    a thin-film transistor including a gate electrode which is diverted from the scan signal transmission line, the thin-film transistor being electrically connected to the data and scan signal transmission lines,
    a pixel electrode connected to the thin-film transistor;
    an interlayer insulating film generally formed beneath the pixel electrode
    wherein the interlayer insulating film and liquid crystal layer are disposed so as to overlie at least part of a diverted portion which is diverted from the auxiliary capacitance line;
    wherein the pixel electrode is provided with an opening formed in a region on part of the diverted portion of the auxiliary capacitance line.

9. The liquid crystal display apparatus of claim 8, wherein the opening of the pixel electrode is formed so as to contact an outer periphery of the pixel electrode.

10. A liquid crystal display apparatus comprising:
    a pair of substrates disposed opposing each other;
    a liquid crystal layer sandwiched therebetween;
    a data signal transmission line for supplying data signals, laid out on one of the substrates;
    a scan signal transmission line for supplying timing signals, laid out on the one of the substrates;
    an auxiliary capacitance line for forming an auxiliary capacitance,
    a thin-film transistor including a gate electrode which is diverted from the scan signal transmission line, the thin-film transistor being electrically connected to the data and scan signal transmission lines,
    a pixel electrode connected to the thin-film transistor;
    an interlayer insulating film generally formed beneath the pixel electrode wherein the interlayer insulating film and liquid crystal layer are disposed so as to overlie at least part of a diverted portion which is diverted from the auxiliary capacitance line;
    wherein the interlayer insulating film is provided with an opening formed in a region thereof on part of the diverted portion of the auxiliary capacitance line.

11. A liquid crystal display apparatus comprising:
    a switching device connected to a gate line and a signal line;
    a common line;
    a drain electrode connected to the switching device, the drain electrode having a section which overlies at least part of the common line;
    a pixel electrode connected to an electrical connection section of the drain electrode;
    a first correction site provided at a narrowed portion of the drain electrode, the first correction site being situated between the switching device and the electrical connection section of the drain electrode;
    a second correction site comprising a narrowed portion of the drain electrode, the second correction site being intermediate the electrical connection section of the drain electrode and the section of the drain electrode which overlies at least part of the common line;
    an opening formed in the pixel electrode to expose the second potential correction site.

12. A liquid crystal display apparatus comprising:
    a switching device connected to a gate line and a signal line, the switching device being situated over the gate line;
    a common line including a common branch diverted from the common line;
    a drain electrode connected to the switching device, the drain electrode having a section which overlies at least part of the common line;
    a pixel electrode connected to an electrical connection section of the drain electrode, the pixel electrode also overlying at least a portion of the common branch diverted from the common line;

a first correction site provided at a narrowed portion of the drain electrode, the first correction site being situated between the switching device and the electrical connection section of the drain electrode;

a second correction site comprising a narrowed portion of the drain electrode, the second correction site being intermediate the electrical connection section of the drain electrode and the section of the drain electrode which overlies at least part of the common line;

a first opening formed in the pixel electrode to expose the first potential correction site;

a second opening formed in the pixel electrode to expose the second potential correction site;

a third opening formed in the pixel electrode to expose at least a portion of the common branch diverted from the common line.

13. A liquid crystal display apparatus comprising:

a switching device connected to a first gate line and a signal line;

a drain electrode connected to the switching device, the drain electrode having a section which overlies at least part of a second gate line;

a pixel electrode connected to an electrical connection section of the drain electrode;

a first correction site provided at a narrowed portion of the drain electrode, the first correction site being situated between the switching device and the electrical connection section of the drain electrode;

a second correction site comprising a narrowed portion of the drain electrode, the second correction site being intermediate the electrical connection section of the drain electrode and the section of the drain electrode which overlies at least part of the second gate line;

a first opening formed in the pixel electrode to expose the first potential correction site; and a second opening formed in the pixel electrode to expose the second potential correction site.

14. The apparatus of claim 13, wherein at least one of the first opening and the second opening is formed at a periphery of the pixel electrode.

15. The apparatus of claim 13, wherein the narrowed portion comprising the first correction site extends parallel to the first gate line.

* * * * *